(12) United States Patent
Heishi et al.

(10) Patent No.: US 6,209,080 B1
(45) Date of Patent: Mar. 27, 2001

(54) CONSTANT RECONSTRUCTION PROCESSOR THAT SUPPORTS REDUCTIONS IN CODE SIZE AND PROCESSING TIME

(75) Inventors: Taketo Heishi; Nobuo Higaki, both of Osaka; Akira Tanaka, Yawata; Tetsuya Tanaka, Ibaraki; Shuichi Takayama, Takarazuka; Kensuke Odani, Kyoto; Shinya Miyaji, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/124,335

(22) Filed: Jul. 29, 1998

(30) Foreign Application Priority Data

Jul. 30, 1997 (JP) .................................................. 9-204124

(51) Int. Cl.⁷ .................................................. G06F 9/30
(52) U.S. Cl. .................................... 712/212; 712/24
(58) Field of Search .............................. 712/210, 235, 712/24, 221, 23, 212, 223

(56) References Cited

U.S. PATENT DOCUMENTS

| | | | |
|---|---|---|---|
| 5,450,556 | * 9/1995 | Slavenburg et al. | 712/235 |
| 5,826,054 | * 5/1999 | Jacobs et al. | 712/212 |
| 5,870,576 | * 2/1999 | Faraboschi et al. | 712/210 |
| 5,901,301 | * 10/1998 | Matsuo et al. | 712/213 |
| 5,974,540 | * 10/1999 | Morikawa et al. | 712/221 |
| 6,026,478 | * 2/2000 | Dowling | 712/24 |
| 6,026,483 | * 2/2000 | Oberman et al. | 712/221 |
| 6,085,306 | * 7/2000 | Takayama et al. | 712/24 |

FOREIGN PATENT DOCUMENTS 3147021 6/1991 (JP) .

* cited by examiner

Primary Examiner—Meng-Al T. An
Assistant Examiner—Jungwon Chiang
(74) Attorney, Agent, or Firm—Price and Gess

(57) ABSTRACT

A processor for executing operations based on instructions includes an operation constant register 361, a branching constant register 362, a decoding unit 20 for decoding an instruction stored in an instruction register 10, a constant register control unit 32, and an execution unit 30. When the decoding unit 20 finds that the instruction includes a constant to be stored in the branching constant register 362, the constant register control unit 32 shifts a present value in the branching constant register 362 and inserts the constant to be stored, thereby storing a new constant in the branching constant register 362. When the decoding unit 20 finds that a constant is to be stored in the operation constant register 361, the constant register control unit 32 shifts the present value in the operation constant register 361 and inserts the constant to be stored, thereby storing a new constant in the operation constant register 361. When the decoding unit 20 finds that the instruction includes a branch operation, the execution unit 30 executes the branch operation using the constant stored in the branching constant register 362. When the decoding unit 20 finds that the instruction includes an arithmetic operation, the execution unit 30 executes the arithmetic operation using the constant stored in the operation constant register 361.

30 Claims, 18 Drawing Sheets

FIG. 3

| SYMBOL | OPERATION | MNEMONIC NOTATION |
|---|---|---|
| cc | BRANCH | eq, eqi, gt, gti, jmp, jmpi, · · · |
| op1 | ARITHMETIC LOGIC OPERATION | add, sub, mul, and, or, cmp, · · · |
| | INTER-REGISTER TRANSFER | mov, movh, movb, · · · |
| op2 | ARITHMETIC LOGIC OPERATION | add, sub, mul, and, or, cmp, · · · |
| | INTER-REGISTER TRANSFER | mov, movh, movb, · · · |
| | REGISTER-MEMORY TRANSFER | ld, ldh, ldb, st, sth, stb, · · · |

FIG. 15

| P0.0 | P1.0 | P2.0 | P2.1 | P2.2 | P3.0 | P3.1 | P3.2 |
|---|---|---|---|---|---|---|---|
| fmt 6 |  | 0x8765 | | | sub | R1 | R0 |
| fmt 1 | 0x4 | add | 0x1 | R1 | mul | R2 | R0 |
| fmt B | 0x0 | add | R15 | R0 | mov | 0x0 | R3 |

| P0.0 | P1.0 | P2.0 | P2.1 | P2.2 | P3.0 | P3.1 | P3.2 |
|---|---|---|---|---|---|---|---|
| fmt 0 | 0x2 | mov | R3 | R1 | add | R5 | R2 |
| fmt 7 | 0x0123 | | | | add | R2 | R1 |
| fmt 0 | 0x4 | mov | R1 | R4 | mov | R1 | R6 |
| fmt 5 | jmpi | mov | 0x0 | R5 | add | R15 | R4 |

↑74 ↑75 ↑76 ↑77 (pointing to P3.0, P3.1, P3.2 columns and R4)

FIG. 19

| P0.0 | P1.0 | P2.0 | P2.1 | P2.2 | P3.0 | P3.1 | P3.2 |
|---|---|---|---|---|---|---|---|
| fmt 0 | 0x2 | mov | R3 | R1 | add | R5 | R2 |
| fmt 0 | 0x4 | nop | | | add | R2 | R1 |
| fmt 4 | nop | mov | R1 | R4 | mov | R1 | R6 |
| fmt 6 | 0x0123 | | | | add | R15 | R4 |
| fmt 5 | jmpi | mov | 0x0 | R5 | nop | | |

↑78 ↑79 ↑80 ↑82

CONSTANT RECONSTRUCTION PROCESSOR THAT SUPPORTS REDUCTIONS IN CODE SIZE AND PROCESSING TIME

BACKGROUND OF THE INVENTION

1. Field of the Invention

The present invention relates to microprocessors and is a technique for making effective use of redundant and unused areas that are present within instructions and for enabling faster processing when a program is executed.

2. Description of the Prior Art

In recent years, increases in processing capability and processing speed of appliances using embedded microprocessors have led to an increasing demand for microprocessors (hereinafter simply referred to as "processors") that can execute programs with high code efficiency. This means that it is preferable for there to be no redundant areas or unused areas in the instructions that compose a program.

In particular, when using fixed length instructions, such as VLIW (Very Long Instruction Words), there are cases when it is necessary to insert redundant codes, such as no-operation codes ("nop" codes), into instructions. VLIW are composed of a plurality of operation fields, with each operation field specifying an operation that corresponds to one of a plurality of operation units provided within a processor. Due to interdependencies between operations, however, it is not always possible to process a plurality of operations using parallel processing.

One conventional method of avoiding the decreases in code efficiency that accompany the insertion of "nop" codes is the VLIW-type computer system disclosed by Japanese Laid-Open Patent Application H08-161169.

FIG. 1 shows the instruction format used in the above technique.

As shown in FIG. 1, when a "nop" code needs to be inserted into a field in which Instruction #2 should be stored, (hereinafter "Operation Field #2) this technique inserts a constant that is to be used by a different operation in place of the "nop" code into operation field #2 and inserts instruction validation information into one part of a field in which instruction #1 should be stored to show that the constant has been inserted. When executing this instruction, a processor first refers to the instruction validation information and so determines that only a constant is present in operation field #2. The processor then uses this constant as the operand of an operation. In this way, the existence of redundant areas within instructions due to the insertion of "nop" codes can be avoided.

The above technique, however, has a drawback in that the size of the constants that can be inserted into the redundant areas is limited.

As one example, when it is necessary to insert a "nop" code into a 32-bit operation field, it is not possible to insert any part of a 64-bit constant. Similarly, when there is an unused 8-bit area in a fixed 32-bit instruction, it is only possible to use the unused area when inserting a constant that is 8 bits long or shorter. In this case, it is not possible to insert an absolute address that is expressed using 32 bits.

While the above technique may be effective when there is a relatively large redundant area in an instruction, when instructions have a relatively short length, such as 32 bits, any redundant area in the instructions will naturally be short, preventing the insertion of constants into a large saw number of redundant areas when using the above technique. This constitutes a major problem.

SUMMARY OF THE INVENTION

The present invention was conceived in view of the stated problems and has a primary object of providing a processor that can make effective use of redundant areas in instructions that are not conventionally used while at the same time making programming easier. The second object of the present invention is to provide a processor capable of faster processing.

The first object of the present invention can be achieved by a processor for executing operations based on instructions, the processor including: an instruction register for storing an instruction; a first constant storage unit including a first storage area; a second constant storage unit including a second storage area; a decoding unit for decoding the instruction stored in the instruction register and for giving an indication of one of the following four cases—(1) a first case where the it instruction includes a first constant to be stored into the first constant storage unit, (2) a second case where the instruction includes a second constant to be stored into the second constant storage unit, (3) a third case where a constant stored in the first constant storage unit is to be used in an operation, and (4) a fourth case where a constant stored in the second constant storage unit is to be used in an operation; a constant transfer unit for operating as follows—(a) when the decoding unit indicates the first case and no valid constant is stored in the first constant storage unit, the constant transfer unit transfers the first constant from the instruction register to the first constant storage unit and sets the transferred first constant in the first constant storage unit as a valid constant, (b) when the decoding unit indicates the first case and a valid constant is stored in the first constant storage unit, the constant transfer unit transfers the first constant from the instruction register to the first constant storage unit so as to retain the valid constant, links the first constant and the valid constant in the first constant storage unit, and sets a linking result as a new valid constant, and (c) when the decoding unit indicates the second case and no valid constant is stored in the second constant storage unit, the constant transfer unit transfers the second constant from the instruction register to the second constant storage unit and sets the transferred second constant in the second constant storage unit as a valid constant, (d) when the decoding unit indicates the second case and a valid constant is stored in the second constant storage unit, the constant transfer unit transfers the second constant from the instruction register to the second constant storage unit so as to retain the valid constant, links the second constant and the valid constant in the second constant storage unit, and sets a linking result as a new valid constant; and an execution unit for operating as follows—(i) when the decoding unit indicates the third case, the execution unit reads the constant stored in the first constant storage unit and executes the operation using the read constant as an operand, and (ii) when the decoding unit indicates the fourth case, the execution unit reads the constant stored in the second constant storage unit and executes the operation using the read constant as an operand.

By doing so, pieces of two constants of different types that are distributed across a plurality of instructions can be respectively accumulated in the first constant storage unit and in the second constant storage unit, thereby restoring the two original constants. By accumulating two constants in parallel, a large decrease can be made in the number of "nop" codes that need to be inserted into a program. As a result, programs for the present processor have a smaller code size and require fewer execution cycles. Programming is also much easier.

Here, the decoding unit may indicate one of the third case and the fourth case based on an operation code for an operation that is included in the instruction in the instruction register.

By doing so, the constant storage unit that is to be used can be decided according to the type of processing to be performed, making programming easier.

Here, the decoding unit may indicate the third case when an operation code shows a branch operation and the fourth case when an operation code shows an arithmetic logic operation, the first constant storage unit being provided specially for branch operations and the second constant storage unit being provided for arithmetic logic operations.

By doing so, different constants can be stored in a first constant storage unit for branching operations and a second constant storage unit for arithmetic logic operations. This also makes programming easier.

Here, in the first case, the constant transfer unit may have a valid value stored in the first constant storage unit shifted by a number of bits in the first constant, transfer the first constant from the instruction register to a free space in the first constant storage unit produced by shifting the valid value, and so link the first constant with the valid value in the first constant storage unit, and in the second case, the constant transfer unit may have a valid value stored in the second constant storage unit shifted by a number of bits in the second constant, transfer the second constant from the instruction register to a free space in the second constant storage unit produced by shifting the valid value, and so link the second constant with the valid value in the second constant storage unit.

With the stated construction, a valid constant stored in the first constant storage unit is shifted by a number of bits in the first constant, and a valid constant stored in the second constant storage unit is shifted by a number of bits in the second constant, so that the same digit positions can be used when storing constants in the first constant storage unit and the second constant storage unit. As a result, management of digit positions is unnecessary.

Here, the constant transfer unit may store first state data showing whether a valid constant is stored in the first constant storage unit and second state data showing whether a valid constant is stored in the second constant storage unit, and: in the first case, after transferring the first constant from the instruction register to the first constant storage unit, the constant transfer unit may change the first state data to show that a valid constant is stored in the first constant storage unit; in the second case, after transferring the second constant from the instruction register to the second constant storage unit, the constant transfer unit may change the second state data to show that a valid constant is stored in the second constant storage unit; in the third case, when the execution unit has read the constant stored in the first constant storage unit, the constant transfer unit may clear the first storage region and change the first state data to show that no valid constant is stored in the first constant storage unit; and in the fourth case, when the execution unit has read the constant stored in the second constant storage unit, the constant transfer unit may clear the second storage region and change the second state data to show that no valid constant is stored in the second constant storage unit.

With the stated construction, by merely storing a constant in a constant storage unit, it can be guaranteed that the constant stored in the constant storage unit will have appropriately been given a zero extension. As a result, a separate deletion instruction for clearing the constant storage unit is not required to clear the constant storage unit every time the content of the constant storage unit is read.

Here, the decoding unit may indicate one of the third case and the fourth case based on operands included in the instruction in the instruction register.

By doing so, a direct indication of the constant storage unit from which a constant is to be read is given by an operand. This makes programming easier.

The first object of the present invention can also be achieved by a processor for executing operations based on instructions, the processor including: an instruction register for storing an instruction; a first constant storage unit including a first storage area; a second constant storage unit including a second storage area; a decoding unit for decoding the instruction stored in the instruction register and for giving an indication of one of four following cases—(1) a first case where the instruction includes a first constant to be stored into the first constant storage unit, (2) a second case where the instruction includes a second constant to be stored into the second constant storage unit, (3) a third case where a constant stored in the first constant storage unit is to be used in an operation, and (4) a fourth case where a constant stored in the second constant storage unit is to be used in an operation; a constant transfer unit for storing first state data showing whether a constant has been read from the first constant storage unit and second state data showing whether a constant has been read from the second constant storage unit, and for operating as follows—(a) when the decoding unit indicates the first case and the first state data shows that a constant has been read from the first constant storage unit, the constant transfer unit clears the first storage region, transfers the first constant from the instruction register to the first constant storage unit, and sets the first state data to show that a constant has not been read from the first constant storage unit, (b) when the decoding unit indicates the first case and the first state data shows that a constant has not been read from the first constant storage unit, the constant transfer unit transfers the first constant from the instruction register to the first constant storage unit without deleting a valid constant that is stored in the first constant storage unit, links the first constant and the valid constant in the first constant storage unit, and sets a linking result as a new valid constant, (c) when the decoding unit indicates the second case and the second state data shows that the constant has been read from the second constant storage unit, the constant transfer unit clears the second storage region, transfers the second constant from the instruction register to the second constant storage unit, and sets the second state data to show that a constant has not been read from the second constant storage unit, and (d) when the decoding unit indicates the second case and the second state data shows that a constant has not been read from the second constant storage unit, the constant transfer unit transfers the second constant from the instruction register to the second constant storage unit without deleting a constant that is stored in the second constant storage unit, links the second constant and a valid constant in the second constant storage unit, and sets a linking result as a new valid constant; and an execution unit for operating as follows—(i) when the decoding unit indicates the third case, the execution unit reads the constant stored in the first constant storage unit and executes the operation using the read constant as an operand, (ii) when the decoding unit indicates the fourth case, the execution unit reads the constant stored in the second constant storage unit and executes the operation using the read constant as an operand, wherein in the third case, after the execution unit reads the constant stored in the first constant storage unit, the constant transfer unit sets the first state data to show that the constant has been read from the first constant storage unit, and in the fourth case, after the execution unit reads the constant stored in the second constant storage unit, the constant transfer unit sets the second state data to show that the constant has been read from the second constant storage unit.

With the stated construction, by merely storing a constant in a constant storage unit, it can be guaranteed that the constant stored in the constant storage unit will have appropriately been given a zero extension. As a result, a separate deletion instruction for clearing the constant storage unit is not required to clear the constant storage unit every time the content of the constant storage unit is read.

The second object of the present invention can be achieved by a processor for executing operations based on instructions, the processor including: an instruction register for storing an instruction; a first constant storage unit including a first storage region for storing a constant in a first format; a second constant storage unit including a second storage region for storing the constant in a second format; a decoding unit for decoding the instruction stored in the instruction register and indicating one of three following cases—(1) a first case where the instruction includes a storage constant that is to be stored in the first constant storage unit and the second constant storage unit, (2) a second case where the constant in the first format is used in an operation, and (3) a third case where the constant in the second format is used in an operation; a constant transfer unit for operating as follows—(a) when the decoding unit gives an indication of the first case and no valid constant is stored in the first constant storage unit and the second constant storage unit, the constant transfer unit transfers the storage constant from the instruction register to the first constant storage unit and the second constant storage unit, and for setting the transferred storage constant in the first constant storage unit and the second constant storage unit as valid constants; (b) when the decoding unit gives an indication of the first case and a valid constant is stored in the first constant storage unit and the second constant storage unit, the constant transfer unit transfers the storage constant from the instruction register to the first constant storage unit and the second constant storage unit so that the valid constants are not deleted, links the transferred storage constant with the valid constant in the first constant storage unit and the valid constant in the second constant storage unit, and sets linking results for the first constant storage unit and the second constant storage unit as valid constants; and an execution unit for reading, when the decoding unit gives an indication of the second case, the constant stored in the first constant storage unit and executing the operation using the read constant, and for reading, when the decoding unit gives an indication of the third case, the constant stored in the second constant storage unit and executing the operation using the read constant.

By doing so, pieces of a constant that are distributed across a plurality of instructions can be accumulated in the first constant storage unit and in the second constant storage unit in a first format and in a second format, respectively, thereby restoring the original constant in the first and second formats. As a result, a same constant can be simultaneously accumulated in a number of formats, so that when the accumulated constant is used in either the first or second format, the processing time can be reduced by the time conventionally taken to change the format of a stored constant.

Here, the first format is a zero-extended format and the second format is a sign-extended format.

By doing so, pieces of a constant that are distributed across a plurality of instructions can be accumulated in the first constant storage unit and in the second constant storage unit in a zero-extended format and in a sign-extended format, respectively, thereby restoring the original constant in the zero-extended and sign-extended formats. As a result, a same constant can be simultaneously accumulated in a number of formats, so that when the accumulated constant is used in either the zero-extended or sign-extended formats, the processing time can be reduced by the time conventionally taken to change the format of a stored constant.

Here, in the first case, the constant transfer unit may have a valid constant stored in the first constant storage unit shifted by a number of bits in the storage constant, transfer the storage constant into a blank space that is produced by a shifting, and link the storage constant with the valid constant in the first constant storage unit, and in the second case, the constant transfer unit may have a valid constant stored in the second constant storage unit shifted by a number of bits in the storage constant, transfer the storage constant into a blank space that is produced by a shifting, and link the storage constant with the valid constant in the second constant storage unit.

With the stated construction, a valid constant stored in the first constant storage unit is shifted by a number of bits in the first constant, and a valid constant stored in the second constant storage unit is shifted by a number of bits in the second constant, so that the same digit positions can be used when storing constants in the first constant storage unit and the second constant storage unit. As a result, management of digit positions is unnecessary.

Here, the constant transfer unit may store state data showing whether a valid constant is stored in the first constant storage unit and the second constant storage unit, and in the first case, after transferring the storage constant from the instruction register to the first constant storage unit and the second constant storage unit, the constant transfer unit may change the state data to show that a valid constant is stored in the first constant storage unit and the second constant storage unit, in the second case, after the execution unit has read the constant from the first constant storage unit, the constant transfer unit may clear the first constant storage unit and the second constant storage unit and change the state data to show that no valid constant is stored in the first constant storage unit and the second constant storage unit, and in the third case, after the execution unit has read the constant from the second constant storage unit, the constant transfer unit may clear the first constant storage unit and the second constant storage unit and change the state data to show that no valid constant is stored in the first constant storage unit and the second constant storage unit.

With the stated construction, by merely storing a constant in a constant storage unit, it can be guaranteed that the constant stored in the constant storage unit will be an appropriate constant that has been given a zero extension. As a result, a separate deletion instruction for clearing the constant storage unit is not required to clear the constant storage unit every time the content of the constant storage unit is read.

Here, the first format and the second format may be a combination of any two of: a zero-extended format a sign-extended format; an absolute value format; a 1's complement format; a 2's complement format; an excess $2^{(n-1)}$ format; a floating-point format; a pack format; and an unpack format.

With the stated construction, pieces of a constant that are distributed across a plurality of instructions can be accumulated in a combination of two formats in the first constant storage unit and in the second constant storage unit, thereby restoring the original constant in two formats. This combination may be any two of; a zero-extended format; a sign-extended format; an absolute value format; a 1's complement format, a 2's complement format; an excess $2^{(n-1)}$ format; a floating-point format; a pack format; and an unpack format. As a result, a same constant can be simultaneously accumulated in a number of formats, so that when the accumulated constant is used in any of the formats, the processing time can be reduced by the time conventionally taken to change the format of a stored constant.

Here, the decoding unit may give an indication for one of the second case and the third case based on an operation code for an operation that is included in the instruction in the instruction register.

By doing so, the constant storage unit which is to be used can be decided according to the type of processing to be performed, making programming easier.

Here, the decoding unit may give an indication for one of the second case and the third case based on an operand that is included in the instruction in the instruction register.

By doing so, a direct indication of the constant storage unit from which a constant is to be read is given by an operand. This makes programming easier.

The second object of the present invention can also be achieved by a processor for executing operations based on instructions, the processor including: an instruction register for storing an instruction; a first constant storage unit including a first storage region for storing a constant in a first format; a second constant storage unit including a second storage region for storing the constant in a second format; a decoding unit for decoding the instruction stored in the instruction register and indicating one of three following cases—(1) a first case where the instruction includes a storage constant that is to be stored in the first constant storage unit and the second constant storage unit, (2) a second case where the constant in the first format is used in an operation, and (3) a third case where the constant in the second format is used in an operation; a constant transfer unit for storing state data showing whether a constant has been read from either of the first constant storage unit and the second constant storage unit, and for operating as follows—(a) when the decoding unit gives an indication of the first case and the state data shows that a constant has been read from one of the first constant storage unit and the second constant storage unit, the constant transfer unit clears the first constant storage unit and the second constant storage unit, transfers the storage constant from the instruction register to the first constant storage unit and the second constant storage unit, and changes the state data to show that a constant has not been read from either of the first constant storage unit and the second constant storage unit, and (b) when the decoding unit gives an indication of the first case and the state data shows that a constant has not been read from one of the first constant storage unit and the second constant storage unit, the constant transfer unit transfers the storage constant from the instruction register to the first constant storage unit and the second constant storage unit so that the respective constants in the first constant storage unit and the second constant storage unit are not deleted, links the transferred storage constant with the valid constant in the first constant storage unit and with the valid constant in the second constant storage unit, and sets respective linking results as new constants; and an execution unit for reading, when the decoding unit gives an indication of the second case, the constant stored in the first constant storage unit and executing the operation using the read constant, and for reading, when the decoding unit gives an indication of the third case, the constant stored in the second constant storage unit and executing the operation using the read constant, wherein in the second case, after the constant in the first constant storage unit has been read by the execution unit, the constant transfer unit clears the first storage region and the second storage region, and changes the state data to show that a constant has been read from one of the first constant storage unit and the second constant storage unit, and in the third case, after the constant in the first constant storage unit has been read by the execution unit, the constant transfer unit clears the first storage region and the second storage region, and changes the state data to show that a constant has been read from one of the first constant storage unit and the second constant storage unit.

With the stated construction, by merely storing a constant in a constant storage unit, it can be guaranteed that the constant stored in the constant storage unit will be an appropriate constant that has been given a zero extension. As a result, a separate deletion instruction for clearing the constant storage unit is not required to clear the constant storage unit every time the content of the constant storage unit is read.

For a VLIW processor that executes instructions made up of a plurality of operations which are to be subjected to parallel processing, when operations to be processed in parallel are not present, a constant for use by a later instruction can be located into the instruction in place of an operation.

With the stated construction, constants can be inserted into not only redundant areas that exist in instructions that indicate a single operation, but also into redundant areas in VLIW that can indicate two or more operations in a single instruction.

For a VLIW processor that executes instructions made up of a plurality of operations which are to be subjected to parallel processing, instructions, which include a constant for use by a later instruction in place of an operation when operations that can be subjected to parallel processing are not present, may be used to have certain operations that do not involve the constant executed in parallel while at the same time accumulating pieces of a constant in order.

By doing so, when a constant is located in only one part of a VLIW, the storage of this constant can be performed in parallel with other operations indicated by the VLIW. Since this accumulated constant can be used by a later instruction, a constant of long word length may be divided and located in a plurality of instructions.

The objects of the present invention can also be achieved by a VLIW (Very Long Instruction Word) processor for decoding and executing instructions, each instruction including a format field storing a format code showing the instruction format and a plurality of operation fields for indicating operations that are to be executed in parallel, the VLIW processor including: an instruction register for storing an instruction; a first constant storage unit including a first storage area; a second constant storage unit including a second storage area; a decoding unit for decoding the format field in the instruction stored in the instruction register and, depending on a content of the format field, for giving an indication of one of two following cases—(1) a first case where at least one operation field includes a first constant to be stored into the first constant storage unit, and (2) a second case where at least one operation field includes a second constant to be stored into the second constant storage unit, and for decoding the operation field in the instruction stored in the instruction register and, depending on a content of the operation field, for giving an indication of one of two following cases—(3) a third case where a constant stored in the first constant storage unit is to be used in at least one operation, and (4) a fourth case where a constant stored in the second constant storage unit is to be used in at least one operation; a constant transfer unit for operating as follows— (a) when the decoding unit indicates the first case and no valid constant is stored in the first constant storage unit, the constant transfer unit transfers the first constant from the instruction register to the first constant storage unit and sets the transferred first constant in the first constant storage unit as a valid constant, (b) when the decoding unit indicates the first case and a valid constant is stored in the first constant storage unit, the constant transfer unit transfers the first constant from the instruction register to the first constant storage unit so as to retain the valid constant, links the first constant and the valid constant in the first constant storage unit, and sets a linking result as a new valid constant, (c) when the decoding unit indicates the second case and no valid constant is stored in the second constant storage unit, the constant transfer unit transfers the second constant from the instruction register to the second constant storage unit and sets the transferred second constant in the second constant storage unit as a valid constant, (d) when the decoding unit indicates the second case and a valid constant is stored in the second constant storage unit, the constant transfer unit transfers the second constant from the instruction register to the second constant storage unit so as to retain the valid constant, links the second constant and the valid constant in the second constant storage unit, and sets a linking result as a new valid constant; and an execution unit for operating as follows—(i) when the decoding unit indicates the third case, the execution unit reads the constant stored in the first constant storage unit and executes the operation using the read constant as an operand, and (ii) when the decoding unit indicates the fourth case, the execution unit reads the constant stored in the second constant storage unit and executes the operation using the read constant as an operand.

With the stated construction, when generating a VLIW sequence to be executed by the processor, it is possible to divide a constant of long word length between a plurality of VLIW. The positions within instructions used for locating constants (operation fields) are clearly indicated by the format code, while the storage destination of a constant (the constant storage unit) and the storage position (bit positions within the constant registers) are implicitly indicated, so that it is unnecessary to provide an explicit operation code for storing a constant given in an instruction into a specified position in the constant storage unit.

There is also the effect that pieces of two constants of different types that are distributed across a plurality se of instructions can be accumulated in the first constant storage unit and in the second constant storage unit, thereby restoring the two original constants. By accumulating two constants in parallel, a large decrease can be made in the number of "nop" codes that need to be inserted into a program. As a result, programs for the present processor have a smaller code size and require fewer execution cycles. Programming is also much easier.

With the present invention described above, when generating a sequence of machine language instructions using a compiler or the like, optimizing scheduling can be performed whereby a constant which is used by a later instruction can be divided and inserted into small redundant areas which are left in the generated instructions. This results in optimization of the code size of the program, an effect which is of particular value to embedded processors.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is a table showing specific operations that are indicated by the three types of operation code, "cc", "op1", and "op2", that are used in FIGS. 2B to 2D;

FIG. 15 shows an example program that has the processor of the present invention execute the procedure shown in FIG. 14;

FIG. 18 shows a program that has the processor of the present invention execute the procedure shown in FIG. 17; and FIG. 19 shows a program that has a processor equipped with only one constant register execute the procedure shown in FIG. 17.

DESCRIPTION OF THE PREFERRED EMBODIMENTS

Two embodiments of the processor of the present invention are described below with reference to the figures. In this specification, the expression "instruction" refers to a set of code that is decoded and executed by the present processor simultaneously and in parallel, while the expression "operation" refers to a unit of processing, such as an arithmetic operation, a logic operation, a transfer, or a branch, which is executed by the present processor in parallel, as well as to the code that indicates each unit of processing.

Embodiment

The processor of this embodiment realizes the first and second objects of the present invention. This processor is characterized by a function for accumulating pieces of a constant that are distributed across a plurality of instructions into a specialized register according to the intended use of the constant. The pieces of the constant are linked in a digit direction to restore what was originally a single constant. With this characteristic operation of the present processor, a constant is stored in appropriate formats in a variety of registers, so that it is possible to restore constants in a variety of formats.

Instruction Format

First, the structure of the instructions that are decoded and executed by the present processor will be described. The present processor is a processor with VLIW architecture (hereinafter, simply a "VLIW processor") that decodes and executes instructions with a fixed word length of 32 bits.

Figure 1:
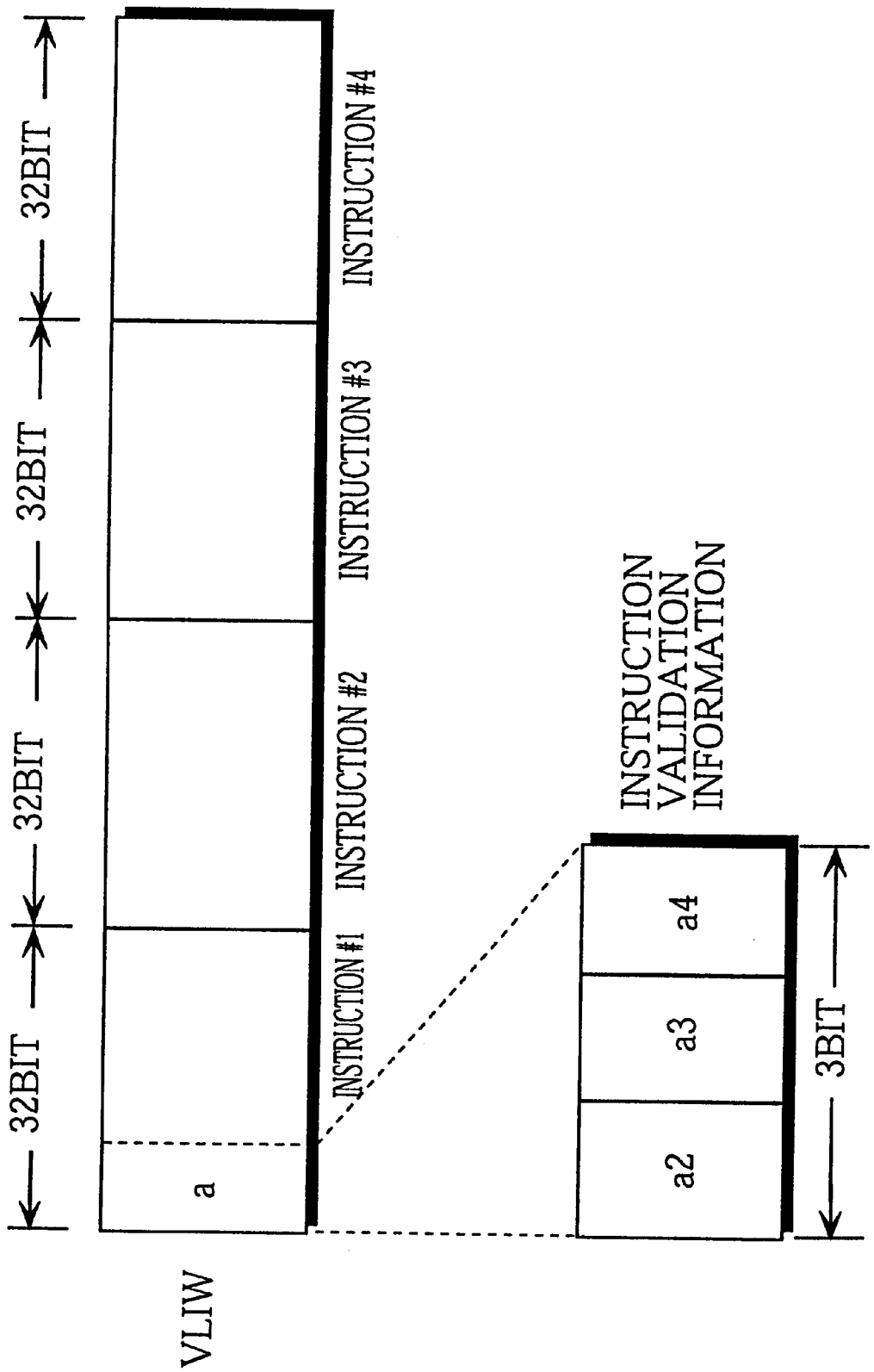
FIG. 1 shows the instruction format used under the prior art.
Figure 2:
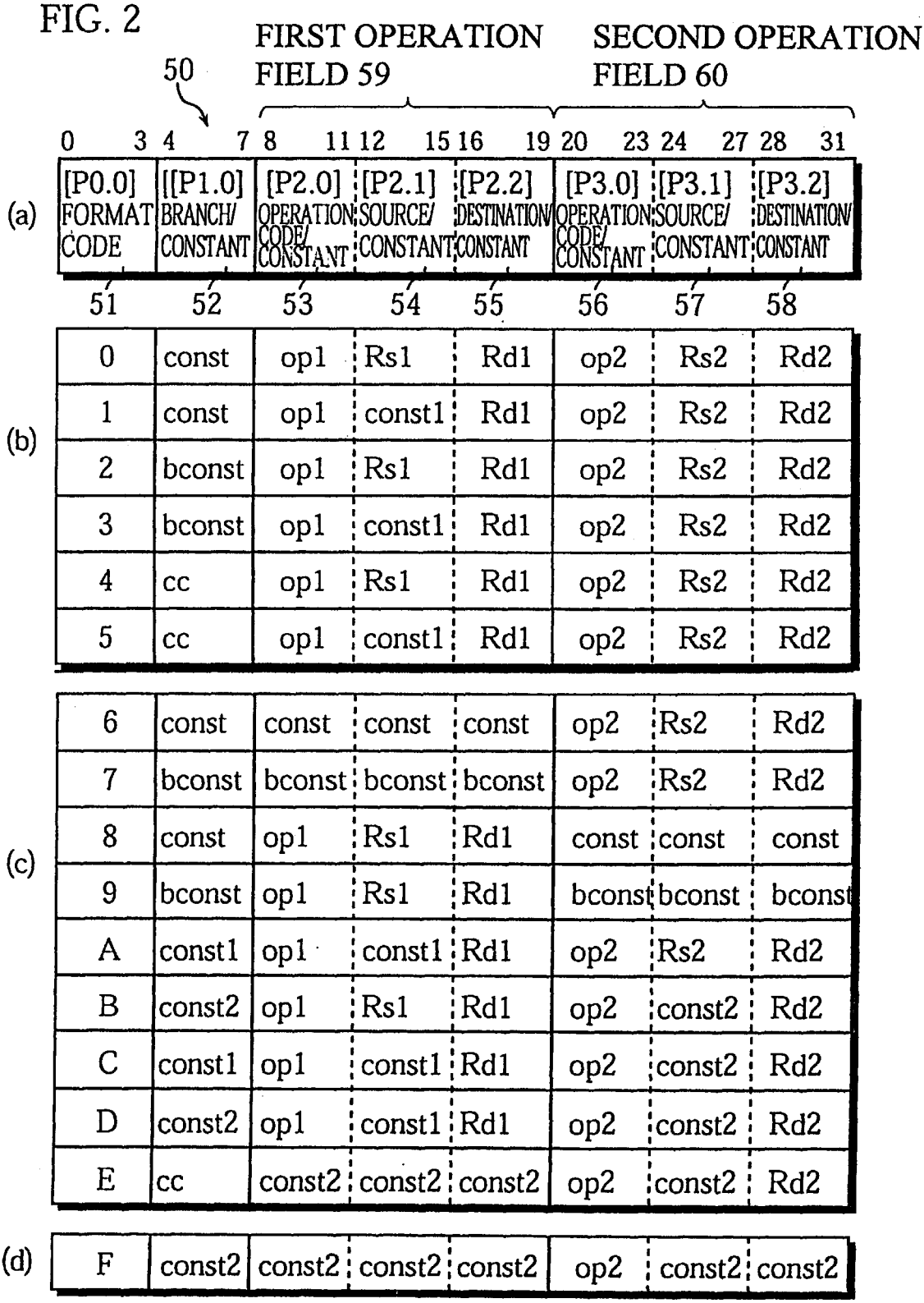
FIG. 2A shows the field structure of an instruction that is executed by the processor of the present invention.
FIGS. 2B to 2D show sixteen types of instruction format.

FIG. 2A shows the field structure of an instruction 50 to be executed by the present processor. FIGS. 2B to 2D, meanwhile, show sixteen instruction formats. Of these, the instruction formats in FIG. 2B simultaneously indicate three operations, the instruction formats in FIG. 2C two operations, and the instruction formats in FIG. 2D a single operation.

This instruction 50 has a fixed word length of 32 bits and is composed of eight 4-bit physical fields shown in order starting from the MSB (Most Significant Bit) as P0.0 field 51, P1.0 field 52, P2.0 field 53, P2.1 field 54, P2.2 field 55, P3.0 field 56, P3.1 field 57, P3.2 field 58 in FIG. 2A. Of these, the range from the P2.0 field 53 to the P2.2 field 55 is called the first operation field 59, while the range from the P3.0 field 56 to the P3.2 field 58 is called the second operation field 60.

In FIGS. 2B to 2D, the legends "const" and "bconst" denote constants. The legend "const" refers to a character constant or a numerical constant that is an immediate for use in an arithmetic logic operation. The legend "bconst", meanwhile, refers to a numeric constant that is an absolute address or relative address used in a branch operation. The legend "op" represents an operation code that indicates an operation type, while the legend "Rs" indicates the register used as the source operand, "Rd" the register used as the destination operand, and "cc" an operation code indicating a branch operation that uses the stored value of a specialized 32-bit register provided in the present processor (the branching constant register 362 shown in FIG. 4) as the absolute address or relative address (displacement) of a branch destination.

The numerical values (the "1" in "const1" or the "2" in "Rs2") given directly after the codes described above show values that are used in the operation in either the first operation field 59 or the second operation field 60. As one example, for the instruction format with the format code "A", the 4-bit constant "const1" located in the P1.0 field 52 and the 4-bit constant "const1" located in the P2.1 field 54 are combined to form an 8-bit constant "const1" that is the source operand corresponding to the operation code "opt1" of the first operation field 59.

As a different example, for the instruction format with the format code "B", the 4-bit constant "const2" located in the P1.0 field 52 and the 4-bit constant "const2" located in the P3.1 field 57 are combined to form an 8-bit constant "const2" that is the source operand corresponding to the operation code "op2" of the second operation field 60.

Figure 4:
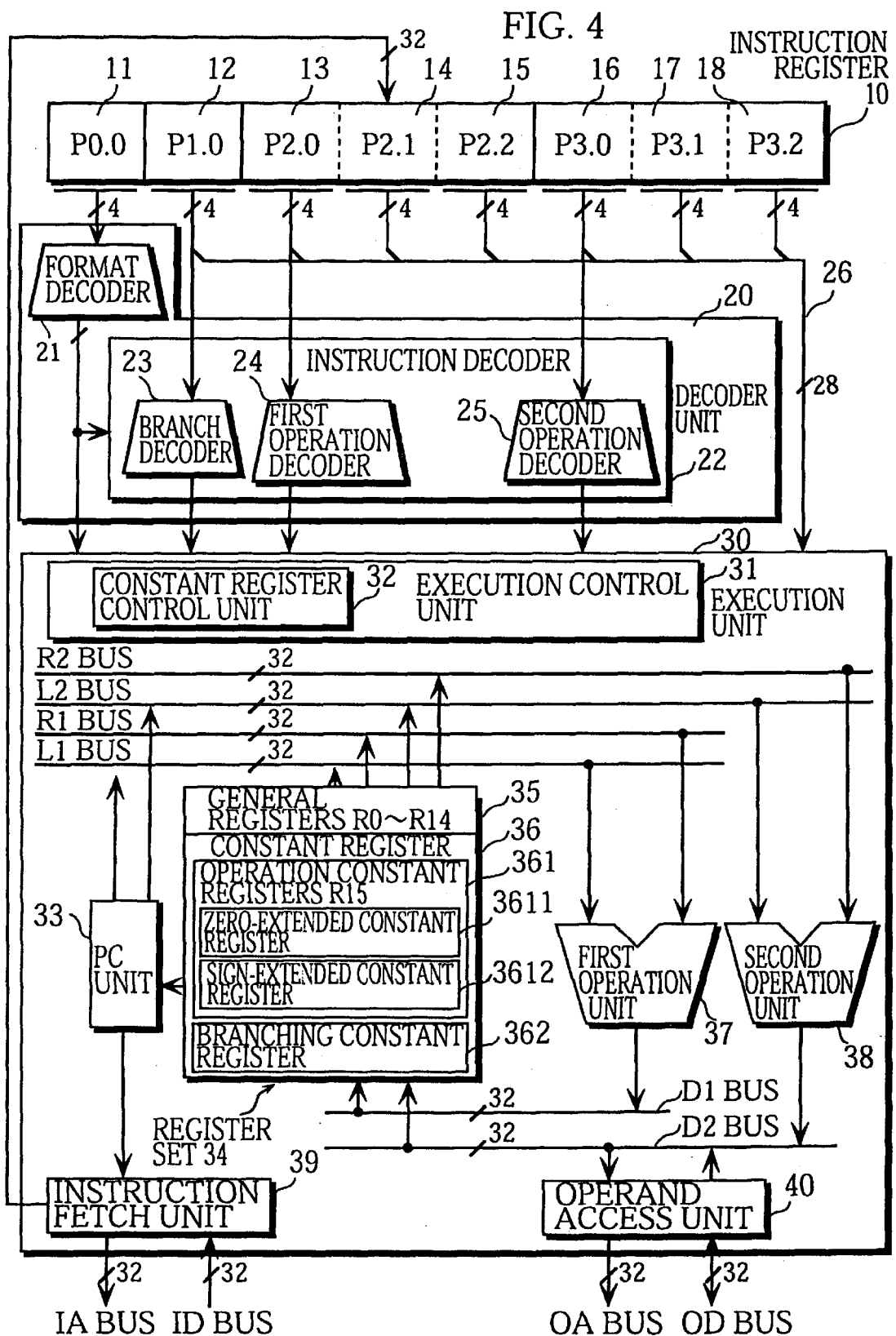
FIG. 4 is a block diagram showing the hardware construction of the present processor.

The constants "const" and "bconst" which are not appended with a number represent constants that are to be stored in the specialized 32-bit register provided in the present processor (the constant register 36 shown in FIG. 4). In more detail, the constant "const" is stored in the operation constant register 361 (in the zero-extended constant register 3611 and the sign-extended constant register 3612), while the constant "bconst" is stored in the branching constant register 362.

As one example, for the instruction format with the format code "0", the 4-bit constant "const" located in the P1.0 field 52 is a constant that is to be stored in the operation constant register 361 which is implicitly indicated. In the same way, for the instruction format with the format code "2", the 4-bit constant "bconst" located in the P1.0 field 52 is a constant that is to be stored in the branching constant register 362 which is implicitly indicated.

FIG. 3 shows specific examples of the operations that can be indicated by the three kinds of operation code "cc", "op1", and "op2" given in FIGS. 2B to 2D. These operations are described in detail below.

The 4-bit operation code "cc" indicates one out of sixteen types of branch instruction. Each branch instruction is specified as a branch condition and a branch format. Examples of branch conditions include "equal to ('eq')", "not equal to ('neq')", "greater than ('gt')", and "unconditional ('jmp')". The branch format can be a format where the stored value of the branching constant register 362 serves as the absolute address of the branch destination (denoted by having no "i" attached to the instruction mnemonic), or a format where the stored value of the branching constant register 362 serves as a relative address (denoted by having "i" attached to the instruction mnemonic). As one example, the operation code "eq" represents an operation that branches to a destination indicated through absolute addressing when a preceding comparison finds the compared values to be equal, while the operation code "eqi" represents an operation that branches to a destination indicated through relative addressing when a preceding comparison finds the compared values to be equal.

The 4-bit operand "op1" can be used to indicate an arithmetic logic operation, such as any of an "add" (addition), a "sub" (subtraction), a "mul" (multiplication), an "and" (logical AND), an "or" (logical OR), or a "cmp" (comparison), or alternatively an operation that is an inter-register transfer, such as any of a "mov" (transfer of word (32-bit) data), a "movh" (transfer of halfword data), or a "movb" (transfer of one byte data).

The 4-bit operand "op2" can be used to indicate any of the arithmetic logic operations or inter-register transfers that can be indicated by the operand "op1", but can also be used to indicate a register-memory transfer operation such as an "ld" (load of one word data from memory into registers) or an "st" (store of one word data into memory from registers).

The arithmetic logic operations given above are classified into operations that use zero-extended constants and operations that use sign-extended constants. As examples, "and" (logical AND) and "add" (addition) instructions are operations that use zero-extended constants, while "cmp" (comparison) is an operation that uses a sign-extended constant.

In this specification, the "zero extension" process refers to a process performed when generating a numeric value with a predetermined number of digits from an original value whose number of valid digits is below the predetermined number of digits. This is achieved by inserting zeros into digits above the highest valid digit of the original value until the predetermined number of digits is reached. The "sign extension" process, meanwhile, also refers to a process performed when an original value has a number of valid digits that is below a predetermined number of digits. In this case, the highest valid digit in the original number is detected as the sign bit, and the same logical value as the sign bit is inserted into higher digits until the predetermined number of digits is reached.

When either kind of extension is performed immediately before an arithmetic logic operation, the overall processing will be delayed by the time taken by the extension processing. In particular, the processing performed during sign extension will change depending on the value of the highest valid bit in the original value, so that the time taken by the extension process, and consequently the delay to the overall processing, will be especially significant.

The characteristic features of the fields 51, 52, 59, and 60 shown in FIG. 2A are described below.

The P0.0 field 51 holds a 4-bit format code that specifies the format of the instruction 50. More specifically, this P0.0 field 51 specifies one of the sixteen instruction formats shown in FIGS. 2B to 2D.

The P1.0 field 52 is a field that holds a constant or an operation code for a branch operation. When a constant is located in the P1.0 field 52 (such as in the instructions with the format codes "0" to "3", "6" to "D", "F") there are cases where the constant is to be stored in the constant register 36 (such as in the instructions with the format codes "0" to "3" and "6" to "9"), and cases where the constant forms one part of the operand in the first operation field 59 or the second operation field 60 (such as in the instructions with the format codes "A" to "D" and "F"). When the constant in the P1.0 field 52 is to be stored in the constant register 36, there are cases where only this 4-bit constant is stored (such as in the instructions with the format codes "0" to "3"), and cases where this constant is stored together with a 12-bit constant located in either the first operation field 59 or the second operation field 60 (such as in the instructions with the format codes "6" to "9"). Of these instructions where the content of the P1.0 field 52 is to be stored in the constant register 36, some (such as the instructions with the format codes "0", "1", "6", and "8") store a constant into the operation constant register 361, while others (such as the instructions with the format codes "2", "3", "7", and "9") store the constant into the branching constant register 362.

The operation constant register 361 is composed of two registers, these being zero-extended constant register 3611 and sign-extended constant register 3612. When a constant is stored into the operation constant register 361, the constant is simultaneously stored into both the zero-extended constant register 3611 and the sign-extended constant register 3612 having been given the appropriate extension for each respective register. When an operation later uses a stored value in the operation constant register 361, a stored value of one of the zero-extended constant register 3611 and the sign-extended constant register 3612 is selected.

When the operation code "cc" for branching is given in the P1.0 field 52 (such as in the instructions with the format codes "4", "5", and "E"), this indicates a branch operation that uses the stored value of the constant register 36 as the absolute address or relative address (displacement) of a branch destination.

The first operation field 59 holds either a constant or a combination of (a) an operation code for indicating an operation (such as an arithmetic logic operation or inter-register transfer) that does not involve data transfer between the present processor and the periphery (memory), and (b) source and destination operands for the operation.

The second operation field 60 can hold the same content as the first operation field 59 described above, but can also alternatively hold a combination of (a) an operation code for indicating an operation (such as memory-register transfer) that involves data transfer between the present processor and the periphery and (b) operands for the operation.

The above assignment of different operation types to certain fields rests on the premises for the present von Neumann-type processor whereby it is not necessary to process two or more branch operations simultaneously, and that only one input/output port (the operand access unit 40 shown in FIG. 4) for transferring operands is provided between the present processor and the periphery (memory)

The instruction formats shown in FIGS. 2B to 2D have the following characteristic features.

First, by focusing on the constants "const" and "bconst", it can be seen that there are the following six types of instruction for storing a constant in the constant register 36.

(1) When the format code is "0" or "1"

In these instructions, the 4-bit constant located in the P1.0 field 52 is stored in the operation constant register 361.

(2) When the format code is "6"

In this instruction, a 16-bit constant located in the P1.0 field 52 to P2.2 field 55 is stored in the operation constant register 361.

(3) when the format code is "8"

In this instruction, a 16-bit constant located in the P1.0 field 52 and the P3.0 field 56~P3.2 field 58 is stored in the operation constant register 361.

(4) When the format code is "2" or "3"

In this instruction, a 4-bit constant located in the P1.0 field 52 is stored in the branching constant register 362.

(5) When the format code is "7"

In this instruction, a 16-bit constant located in the P1.0 field 52~P2.2 field 55 is stored in the branching constant register 362.

(6) When the format code is "9"

In this instruction, a 16-bit constant located in the P1.0 field 52 and the P3.0 field 56~P3.2 field 58 is stored in the branching constant register 362.

Secondly, for the present processor, a maximum of three operations can be indicated by a single instruction, and in this case, as can be seen from the triple operation formats shown in FIG. 2B, either of the following combinations of operation types can be used.

(1) One operation that sets a 4-bit constant into the constant register 36 and two standard operations (when the format code is "0"~"3").

(2) One operation that performs branching using the value set in the constant register 36 as an absolute address or a relative address and two standard operations (when the format code is "4" or "5").

As described above, the Instructions used by present processor have a highly efficient field structure that enables a maximum of three operations to be simultaneously indicated by a single 32-bit instruction.

Hardware-Construction of the Processor

The hardware construction of the present processor is described below.

FIG. 4 is a block diagram showing the hardware construction of the processor of the present invention. As described above, this processor is a VLIW processor that can execute a maximum of three operations in parallel. The construction of the processor can be roughly divided into an instruction register 10, a decoder unit 20, and an execution unit 30.

The instruction register 10 is a 32-bit register that stores one instruction that has been sent from the instruction fetch unit 39.

The decoder unit 20 decodes the instruction held in the instruction register 10 and performs output on control lines to the execution unit 30 in accordance with the decoding result. This decoder unit 20 can itself be roughly divided into the format decoder 21 and the instruction decoder 22.

The instruction decoder 22 is composed of a branch decoder 23 that decodes the "cc" operation code held in the P1.0 field 12 and controls the PC unit 33 accordingly, a first operation decoder 24 that decodes the operation code held in the P2.0 field 13 and controls the first operation unit 37 accordingly, and a second operation decoder 25 that decodes the operation code held in the P3.0 field 16 and controls the second operation unit 38 and operand access unit 40 accordingly.

The format decoder 21 decodes the 4-bit format code held in the P0.0 field 11 to identify the instruction format of the instruction held in the instruction register 10 as one of the sixteen possible instruction formats shown in FIGS. 2B to 2D. In accordance with the decoding result, the format decoder 21 permits or prohibits decoding operations by the branch decoder 23, the first operation decoder 24, and the second operation decoder 25, and activates the constant register control unit 32 of the execution unit 30.

The format decoder 21, the branch decoder 23, the first operation decoder 24, and the second operation decoder 25 fundamentally decode one operation in one cycle and send control signals to the execution unit 30. Here, the 28-bit constant signal line 26 that connects the instruction register 10 with the execution unit 30 is a bus for transferring constants and operands located in the instruction register 10 to the execution unit 30.

The execution unit 30 operates according to the decoding result of the decoder unit 20 and is a circuit that is capable of executing a maximum of three operations in parallel. This execution unit 30 is composed of an execution control unit 31, a PC unit 33, a register set 34, a first operation unit 37, a second operation unit 38, an instruction fetch unit 39, and an operand access unit 40. Out of the components in the execution unit 30, the constructions of the register control unit 32, the PC unit 33, and the constant register 36 are shown in greater detail in the other drawings.

The execution control unit 31 refers in general to the control circuits and wiring for controlling the components numbered 33 to 40 in the execution unit 30 according to the decoding result of the decoder unit 20. This execution control unit 31 includes the components that are normally provided in a processor, such as circuits for timing control, operation permission/prohibition control, status management, and interruption control, as well as the constant register control unit 32 which is a characteristic component of the present processor. The constant register control unit 32 performs control so that a 4- or 16-bit constant ("const" or "bconst") held in the instruction register 10 is stored into the three registers (the zero-extended constant register 3611, the sign-extended constant register 3612, and the branching constant register 362) in the constant register 36 based on indications given by the format decoder 21.

The PC (Program Counter) unit 33 operates under the control of the branch decoder 23, and outputs the address in an external memory (not illustrated) of the next instruction to be decoded and executed to the instruction fetch unit 39.

The instruction fetch unit 39 fetches an instruction block from the external memory (not illustrated) via a 32-bit IA (Instruction Address) bus and a 32-bit ID (Instruction Data) bus. The instruction fetch unit 39 stores the fetched instruction block in an internal instruction cache and supplies the instruction which corresponds to the address outputted by the PC unit 33 to the instruction register 10.

The register set 34 is composed of fifteen 32-bit general registers 35 and the constant register 36 that includes three 32-bit constant registers (the zero-extended constant register 3611, the sign-extended constant register 3612, and the branching constant register 362).

In accordance with the decoding results of the first operation decoder 24 and the second operation decoder 25, the values which are stored in these eighteen registers 35 and 36 are transferred to the first operation unit 37 and the second operation unit 38. Here, an operation is performed or alternatively the values are allowed to pass, before being sent to the register set 34 or the operand access unit 40. A value stored in the operation constant register 361 of the constant register 36 is used in the operations performed by the first operation unit 37 and the second operation unit 38, while the value stored in the branching constant register 362 in the constant register 36 is transferred to the PC unit 33, where it is used to generate an effective address for a branch destination.

The operation constant register 361 is composed of the two registers, zero-extended constant register 3611 and sign-extended constant register 3612. The value to be used in calculation is taken from one of these two registers according to the operation that performs the calculation.

The first operation unit 37 internally includes an ALU (Arithmetic Logic Unit) for performing arithmetic logic operations on two 32-bit sets of data and a multiplier for performing multiplications on two 32-bit sets of data. This first operation unit 37 is capable of executing two types of operation (namely, arithmetic logic operations, and inter-register transfer operations) under the control of the first operation decoder 24.

The second operation unit 38 internally includes an ALU for performing arithmetic logic operations on two 32-bit sets of data and a multiplier for performing multiplications on two 32-bit sets of data, in the same way as the first operation unit 37. This second operation unit 38 is capable of executing two types of operation (namely, arithmetic logic operations, and inter-register transfer operations) under the control of the second operation decoder 25.

The operand access unit 40 operates under the control of the second operation decoder 25 and is a circuit that transfers operands between the register set 34 and the external memory (not illustrated). The operand access unit 40 internally includes a buffer for storing operands and operand addresses. As a specific example, when the operation code "ld" is in the P3.0 field 16 of the instruction register 10, one word of data that is located in the external memory is loaded via the operand access unit 40 into one of the registers in the register set 34. When the operation code "st" is present, meanwhile, the stored value or one of the registers in the register set 34 is stored in the external memory.

The PC unit 33, the register set 34, the first operation unit 37, the second operation unit 38, and the operand access unit 40 are connected by internal buses (the L1 bus, the R1 bus, the L2 bus, the R2 bus, the D1 bus, and the D2 bus) as shown in FIG. 4. Here, the L1 bus and the R1 bus are each connected a respective one of the two input ports of the first operation unit 37, the L2 bus and the R2 bus are each connected to a respective one of the two input ports of the second operation unit 38, and the D1 bus and the D2 bus are respectively connected to an output port of the first operation unit 37 and the second operation unit 38.

Detailed Construction of the Constant Register 36 and its Periphery

The following is a detailed description of the construction of the constant register 36 and of the peripheral circuits.

As shown in FIG. 4 the constant register 36 is composed of an operation constant register 361 and a branching constant register 362, with the operation constant register 361 being further composed of a zero-extended constant register 3611 and a sign-extended constant register 3612.

Figure 5:
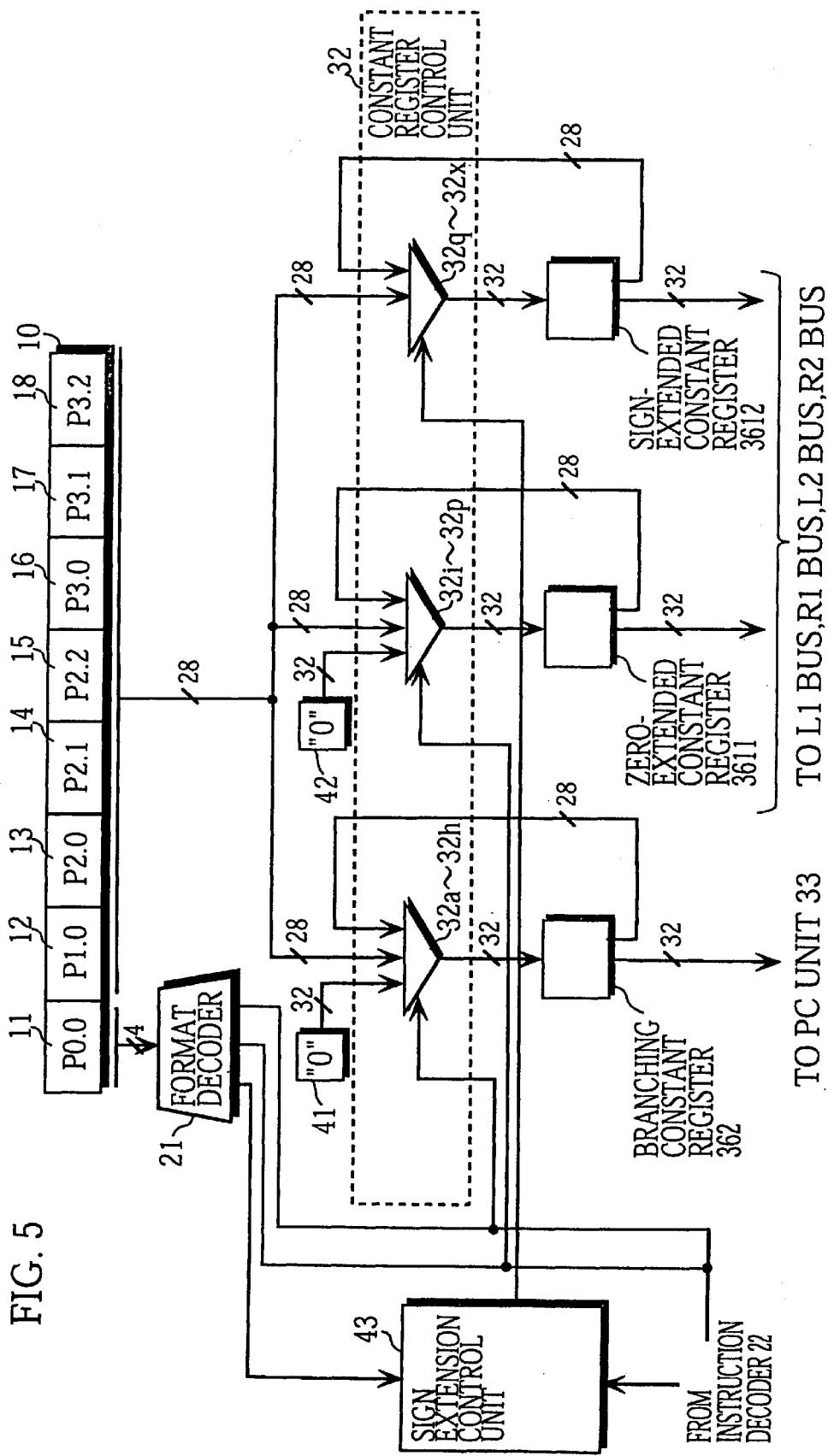
FIG. 5 is a block diagram showing the simplified construction of the branching constant register 362, the zero-extended constant register 3611, and the sign-extended constant register 3612 of the present processor and the peripheral circuits.

FIG. 5 is a block diagram showing a simplification of the construction of the branching constant register 362, the zero-extended constant register 3611, the sign-extended constant register 3612, and their peripheral circuits.

The constant register control unit 32 includes a total of 24 input selectors which are composed of eight input selectors 32a~32h for the branching constant register 362, eight input selectors 32i~32p for the zero-extended constant register 3611 and eight input selectors 32q~32x for the sign-extended constant register 3612. Each selector selects a 4-bit set of data. The eight input selectors for each of the specialized registers select 32-bit data from the 28-bit input from the P1.0 field 12~P3.2 field 18 of the instruction register 10 and an input from the corresponding register, and have the selected data stored in the corresponding register.

The fixed value "0" 41 in FIG. 5 is used to clear the branching constant register 362. This inputs a 4-bit constant "0" into each of the input selectors 32a~32h.

The fixed value "0" 42 in FIG. 5 is used to clear the zero-extended constant register 3611. This inputs a 4-bit constant "0" into each of the input selectors 32i~32p.

The sign extension control unit 43 in FIG. 5 is provided to give a sign extension a value in the sign-extended constant register 3612. The sign extension control unit 43 controls the input selectors 32q~32x to give a sign extension to the stored value.

When the result of the format decoder 21 decoding the format code is that the format code is one of "2", "3", "7" and "9" which are instruction formats that store a numerical constant used in a branching operation, only the input selectors 32a~32h for the branching constant register 362 select an input so that the numerical constant is stored in the branching constant register 362. When the result of the format decoder 21 decoding the format code is that the format code is one of "0", "1", "6" and "8" which are instruction formats that store a numerical constant used in an arithmetic logic operation, the input selectors 32i~32p for the zero-extended constant register 3611 select an input so that the numerical constant is zero-extended and stored in the zero-extended constant register 3611, while at the same time the input selectors 32r~32x for the sign-extended constant register 3612 select an input so that the numerical constant is sign-extended and stored in the sign-extended constant register 3612.

A detailed description of the storage of numerical constants is given after the description of the various constant registers.

The absolute address or relative address (displacement) used as a branch destination of a branch operation is divided into pieces that are distributed among a plurality of instructions that precede the execution of the branch operation. These pieces are successively stored in the branching constant register 362 to restore the address to its original state. The content of this branching constant register 362 is used when the branch operation is executed.

A constant for use in an arithmetic logic operation is divided into pieces that are distributed among a plurality of instructions that precede the execution of the arithmetic logic operation. These pieces are successively extended and stored into both the zero-extended constant register 3611 and the sign-extended constant register 3612 to produce a version of the original constant that has a respective zero or sign extension. When the arithmetic logic operation in question is executed, the content of either the zero-extended constant register 3611 or the sign-extended constant register 3612 is used depending on the operation content. As one example, logic operations may use the stored content of the zero-extended constant register 3611 while arithmetic operations may use the stored content of the sign-extended constant register 3612.

As described above, one of the zero-extended constant register 3611 and the sign-extended constant register 3612 is indicated by the content of an operation and is not explicitly specified by one of the operation fields. As a result, when a content of either of these registers is used, the operation field in question indicates the general name "R15". This name "R15" indicates the operation constant register 361, which is itself the general name for the zero-extended constant register 3611 and the sign-extended constant register 3612.

Figure 6:
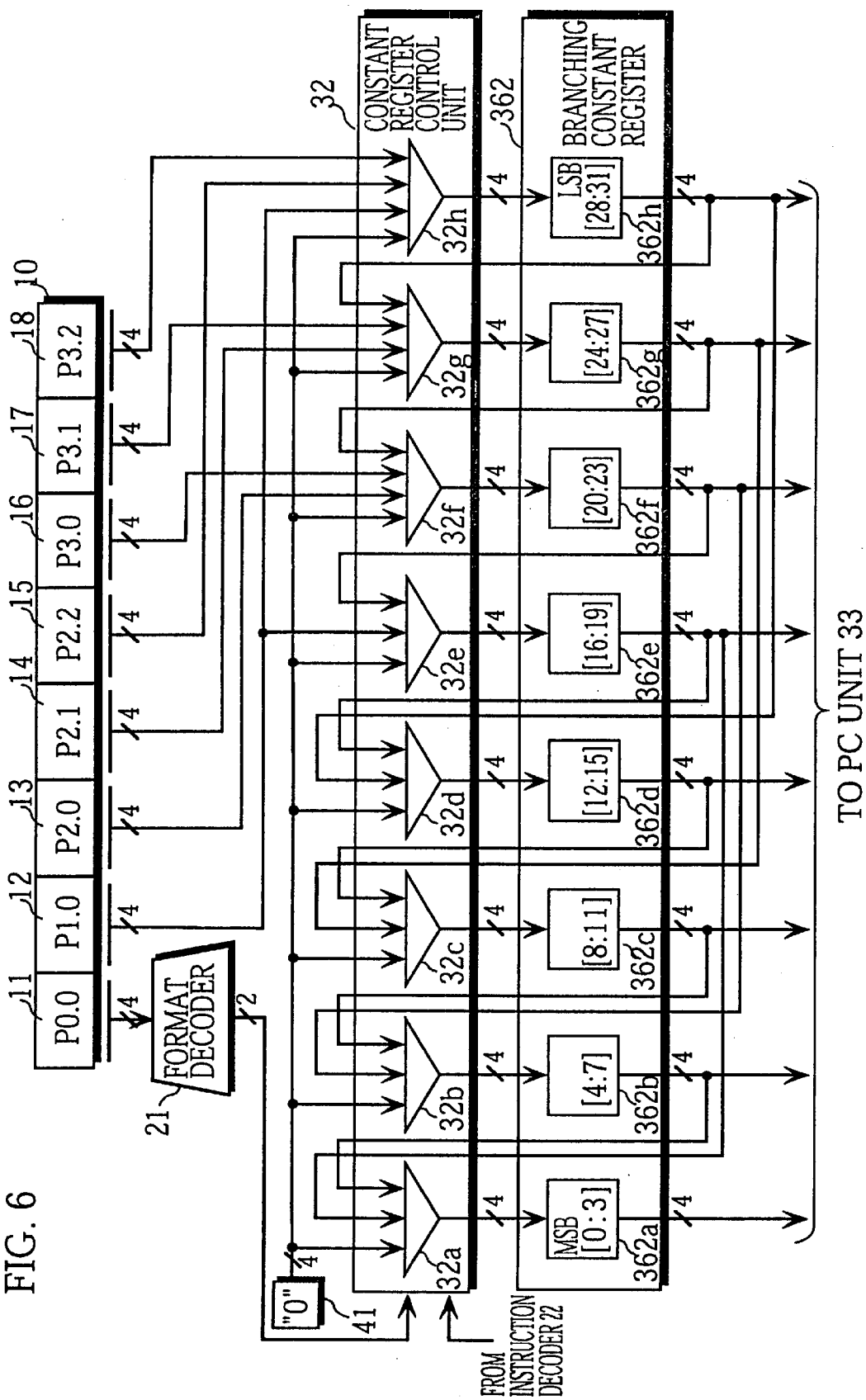
FIG. 6 is a block diagram showing the construction of the branching constant register 362 and its peripheral circuits in detail.

FIG. 6 is a block diagram showing the detailed construction and connection pattern of the branching constant register 362 and of the peripheral circuits. Note here that the fixed value ("0") 41 in the drawings refers to fixed wiring for four signal lines carrying the constant "0".

The 8 input selectors 32a~32h for the branching constant register 362 that are included in the constant register control unit 32 are composed of 5 3-input selectors (32a~32e), and 3 4-input selectors (32f~32h). The branching constant register 362 is composed of 8 4-bit registers 362a~362h, with each of these storing a 4-bit output from a corresponding one of the input selectors 32a~32h.

In accordance with control signals from the format decoder 21 and the instruction decoder 22, the constant register control unit 32 controls the eight input selectors 32a~32h so that a constant stored in the instruction register 10 or zeros are stored in the branching constant register 362 according to one of the four storage methods given below.

FIGS. 7A to 7D show the four possible storage methods in the present embodiment.

Figure 7A:
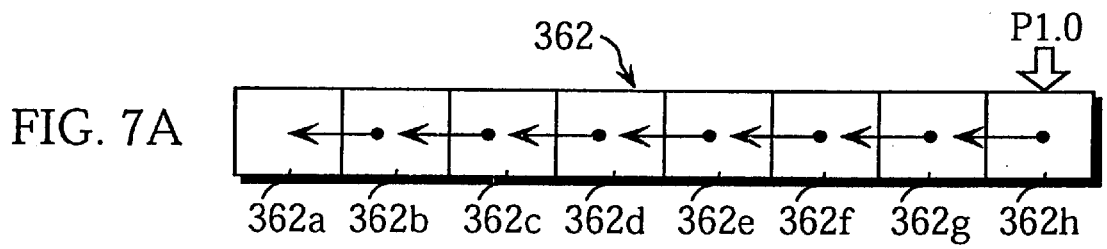
FIGS. 7A to 7D are representations of different methods for storing a constant.

FIG. 7A shows a storage method for when the format decoder 21 detects that the value stored in the P0.0 field 11 is "2" or "3". This equates to the case when only a 4-bit constant located in the P1.0 field 12 is stored in the branching constant register 362. More specifically, the data that is stored in the branching constant register 362 is shifted upwards (to the left in FIG. 7A) in 4-bit units and the 4-bit constant stored in the P1.0 field 12 of the instruction register 10 is stored in the lowest-order 4-bit register 362h of the branching constant register 362.

Figure 7B:
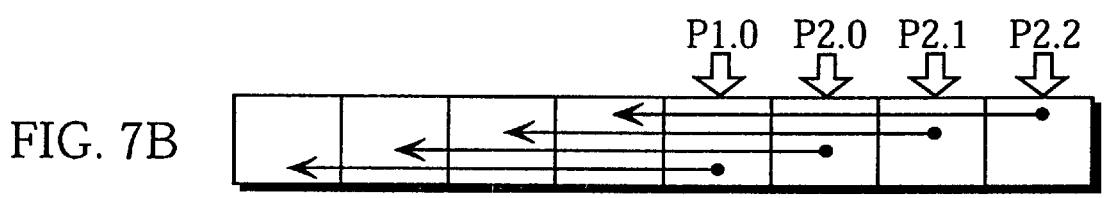

FIG. 7B shows a storage method for when the format decoder 21 detects that the value stored in the P0.0 field 11 is "7". This equates to the case when a 16-bit constant located between the P1.0 field 12 and the P2.2 field 15 is stored in the branching constant register 362. More specifically, the data that is stored in the lower 16 bit 362e~362h of the branching constant register 362 is shifted to the upper 16 bits 362a~362d and the 16-bit constant located between the P1.0 field 12 and the P2.2 field 15 of the instruction register 10 is stored in the lowest-order 16-bits 362e~362h of the branching constant register 362.

Figure 7C:
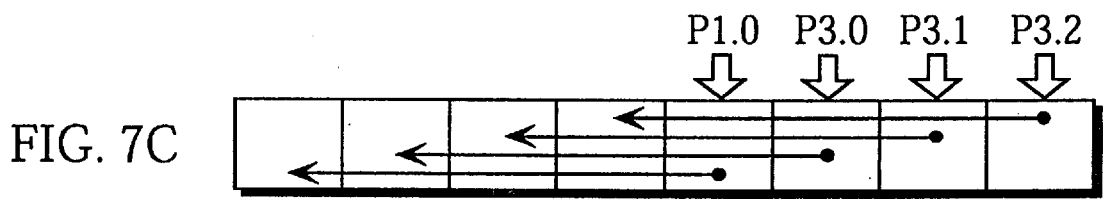

FIG. 7C shows a storage method for when the format decoder 21 detects that the value stored in the P0.0 field 11 is "9". This equates to the case when a 16-bit constant located in the P1.0 field 12 and between the P3.0 field 16 and the P3.2 field 18 is stored in the branching constant register 362. More specifically, the data that is stored in the lower 16 bits 362e~362h of the constant register 36 is shifted to the upper 16 bits 36a~36d and the 16-bit constant located in the P1.0 field 12 and between the P3.0 field 16 and the P3.2 field 18 of the instruction register 10 is stored in the lowest-order 16-bits 362e~362h of the branching constant register 362.

Figure 7D:
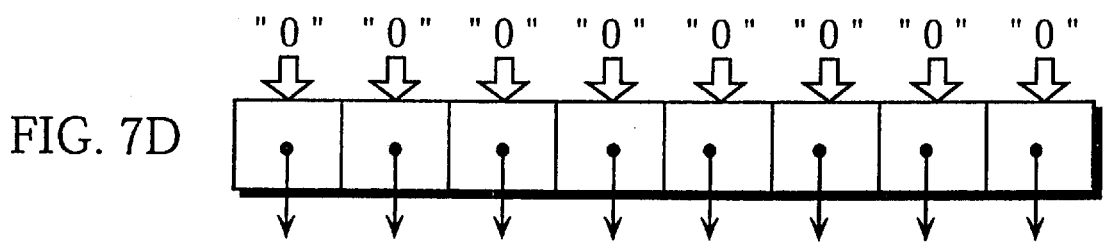

FIG. 7D shows the storage method used when the format decoder 21 detects that the value stored in the P0.0 field 11 is "4", "5", or "E". This equates to the case where the value stored in the branching constant register 362 is reset to all zeros (which is to say, the branching constant register 362 is cleared), after the stored value of the branching constant register 362 has been used by a branch operation located in the P1.0 field 12, which is to say, after the stored value has been read. More specifically, immediately after the stored value of the constant register 36 has been read out to the PC unit 33, a 32-bit constant with the value "0" is written into the branching constant register 362.

Here, the value in the branching constant register 362 is cleared after being used to ensure that a value with a zero extension is always stored in the branching constant register 362.

As described above, when the value in the P0.0 field 11 of the instruction register 10 is "2", "3", "7", or "9", the constant that is already stored in the branching constant register 362 is shifted and a new value is stored. Also, after the value stored in the constant register 36 is read out and used, this stored value is deleted. By doing so, the branching constant register 362 is able to successively accumulate constants until the next time its stored content is used, at which point the content of the branching constant register 362 is cleared.

Figure 8:
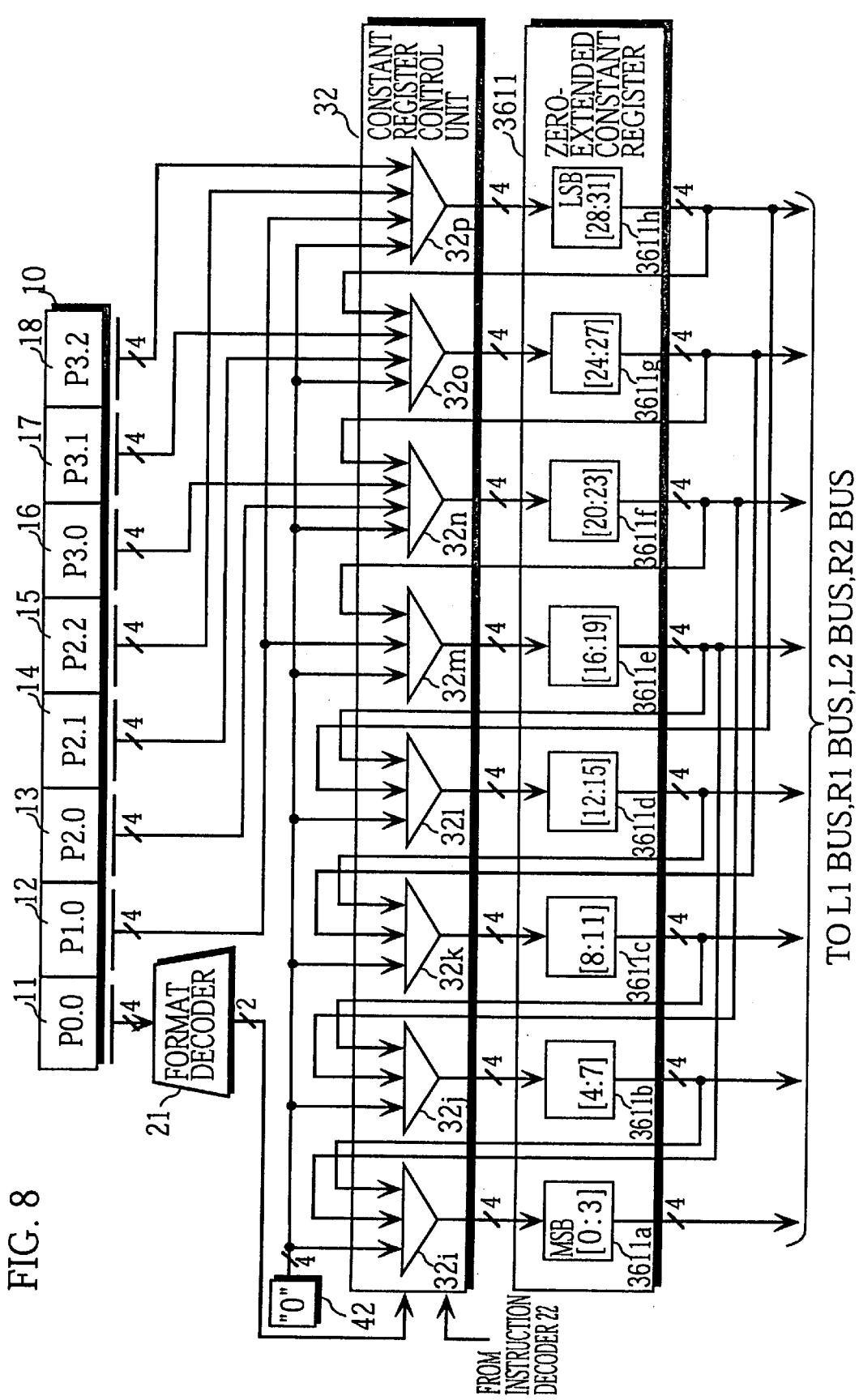
FIG. 8 is a block diagram showing the detailed construction and connection pattern of the zero-extended constant register 3611 and its peripheral circuits.

FIG. 8 is a block diagram showing the detailed construction and connection pattern of the zero-extended constant register 3611 and of the peripheral circuits. Note here that the fixed value ("0") 42 in the drawings refers to fixed wiring for four signal lines carrying the constant "0".

The 8 input selectors 32i~32p for the zero-extended constant register 3611 that are included in the constant register control unit 32 are composed of 5 3-input selectors (32i~32m), and 3 4-input selectors (32n~32p). The zero-extended constant register 3611 is composed of 8 4-bit registers 3611a~3611h, with each of these storing a 4-bit output from a corresponding one of the input selectors 32i~32p.

The construction of the zero-extended constant register 3611 is the same as that of the branching constant register 362 described above.

In accordance with control signals from the format decoder 21 and the instruction decoder 22, the constant register control unit 32 controls the eight input selectors 32i–32p so that a constant stored in the instruction register 10 or zeros are stored in the zero-extended constant register 3611 according to the same storage methods used for the branching constant register 362.

FIGS. 7A to 7D show the four possible storage methods in the present embodiment. Here, input selectors 32i~32p for the zero-extended constant register 3611 are used instead of the input selectors 32a~32h for the branching constant register 362.

The storage method shown in FIG. 7A is used for the zero-extended constant register 3611 when the format decoder 21 detects that the value stored in the P0.0 field 11 is "0" or "1".

The storage method shown in FIG. 7B is used for the zero-extended constant register 3611 when the format decoder 21 detects that the value stored in the P0.0 field 11 is "6".

The storage method shown in FIG. 7C is used for the zero-extended constant register 3611 when the format decoder 21 detects that the value stored in the P0.0 field 11 is "8".

The storage method shown in FIG. 7D is used for the zero-extended constant register 3611 when the format decoder 21 detects that the value stored in the P0.0 field 11 is "4", "5", or "E". This method is also used when the instruction decoder 22 finds that the operation constant register R15 is specified by at least one of the P2.1 field 14, P2.2 field 15, P3.2 field 17, and the P3.3 field 18. Once the value stored in the zero-extended constant register 3611 has been used by an operation given in at least one of the first operation field 59 and the second operation field 60, which is to say, once the stored value of the zero-extended constant register 3611 has been read and outputted to at least one of the first operation unit 37 and second operation unit 38, all zeros are stored in the zero-extended constant register 3611 to clear its content.

Here, the value in the zero-extended constant register 3611 is cleared after a stored value of either the zero-extended constant register 3611 or the sign-extended constant register 3612 is used to ensure that a value with a zero extension is always stored in the zero-extended constant register 3611.

Figure 9:
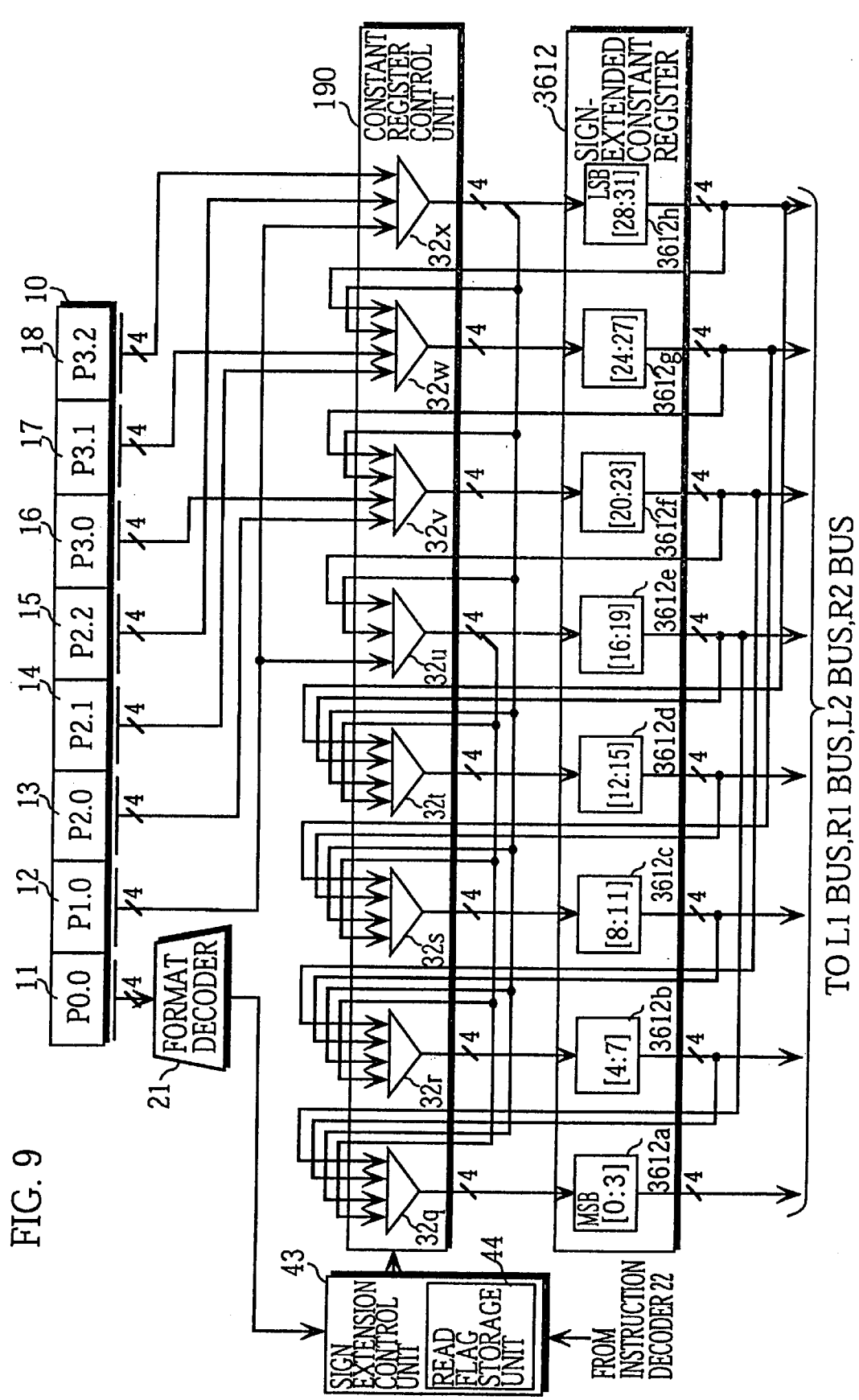
FIG. 9 is a block diagram showing the detailed construction and connection pattern of the sign-extended constant register 3612 and its peripheral circuits.

FIG. 9 is a block diagram showing the detailed construction and connection pattern of sign-extended constant register 3612 and its peripheral circuits.

The 8 input selectors 32q~32x for the sign-extended constant register 3612 that are included in the constant register control unit 32 are composed of 2 3-input selectors 32u, 32x), and 6 4-input selectors (32q~32t, 32v, 32w). The sign-extended constant register 3612 is composed of 8 4-bit registers 3612a~3612h, with each of these storing a 4-bit output from a corresponding one of the input selectors 32q~32x.

The sign extension control unit 43 is equipped with a read flag storage unit 44 for storing a read flag. This read flag is cleared whenever even one part of a constant is stored in the zero-extended constant register 3611 and the sign-extended constant register 3612 and is set whenever a stored value of either of the zero-extended constant register 3611 and the sign-extended constant register 3612 is read. If the read flag is in a set state when a constant is to be stored in the sign-extended constant register 3612, an indication is given to the constant register control unit 32 to add a sign extension to the constant stored in the instruction register 10 and to store the result in the sign-extended constant register 3612. If the read flag is not in a set state when a constant is to be stored in the sign-extended constant register 3612, an indication is given to the constant register control unit 32 store the constant into the sign-extended constant register 3612 without adding a sign extension, which is to say, to store the constant using the same method as for storing in the zero-extended constant register 3611.

The zero-extended constant register 3611 is similar to the sign-extended constant register 3612 and the branching constant register 362 in that the stored value is shifted when a new value is stored to gradually accumulate a stored value.

The sign-extended constant register 3612 differs from the other registers, however, in that the first value stored in the sign-extended constant register 3612 after clearing is given a sign extension and in that the content of the sign-extended constant register 3612 is not cleared after being read.

As described above, when the value in the P0.0 field 11 is "0", "1", "6", or "8", the constant that is already stored in the zero-extended constant register 3611 is shifted and a new value is stored in the zero-extended constant register 3611 with a zero extension. At the same time, the constant that is already stored in the sign-extended constant register 3612 is shifted and a new value is stored in the sign-extended constant register 3612 with a sign extension. When a stored value of either of the zero-extended constant register 3611 and the sign-extended constant register 3612 is read, the stored value of the zero-extended constant register 3611 is cleared, though the stored value of the sign-extended constant register 3612 is not cleared. The value of the sign-extended constant register 3612 is only cleared when a new constant is stored.

With the present configuration, constants are progressively accumulated in the zero-extended constant register 3611 and the sign-extended constant register 3612 until the stored value of either is read.

In FIG. 9, the signal lines that connect the output of the input selector 32x to the inputs of the input selectors 32q~32w are used when added a sign extension to a 4-bit constant stored in the instruction register 10. As a result, only the highest bit in the output of the input selector 32x is connected to the collected 28-bit input of the input selectors 32q~32w.

Also in FIG. 9, the signal lines that connect the output of the input selector 32u to the inputs of the input selectors 32q~32t are used when added a sign extension to a 16-bit constant stored in the instruction register 10. As a result, only the highest bit in the output of the input selector 32u is connected to the collected 16-bit input of the input selectors 32q~32t.

Figure 10:
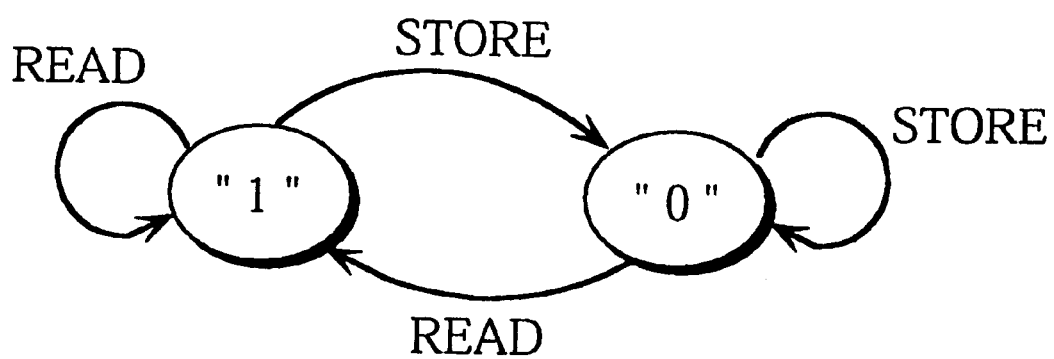
FIG. 10 is a state transition figure showing the changes in the value of the read flag storage unit 44.

FIG. 10 is a state transition figure showing the changes in the value of the read flag storage unit 44.

On receiving notification from the format decoder 21 or the instruction decoder 22 that the stored value of either of the zero-extended constant register 3611 or the sign-extended constant register 3612 has been read, the sign extension control unit 43 sets the value of the read flag at "1". On receiving notification from the format decoder 21 that a constant has been stored in the sign-extended constant register 3612, meanwhile, the read flag storage unit 44 clears the value of the read flag to "0".

FIGS. 11A to 11F show a transition in the stored values of the zero-extended constant register 3611, the sign-extended constant register 3612, and the read flag storage unit 44.

Figure 11:
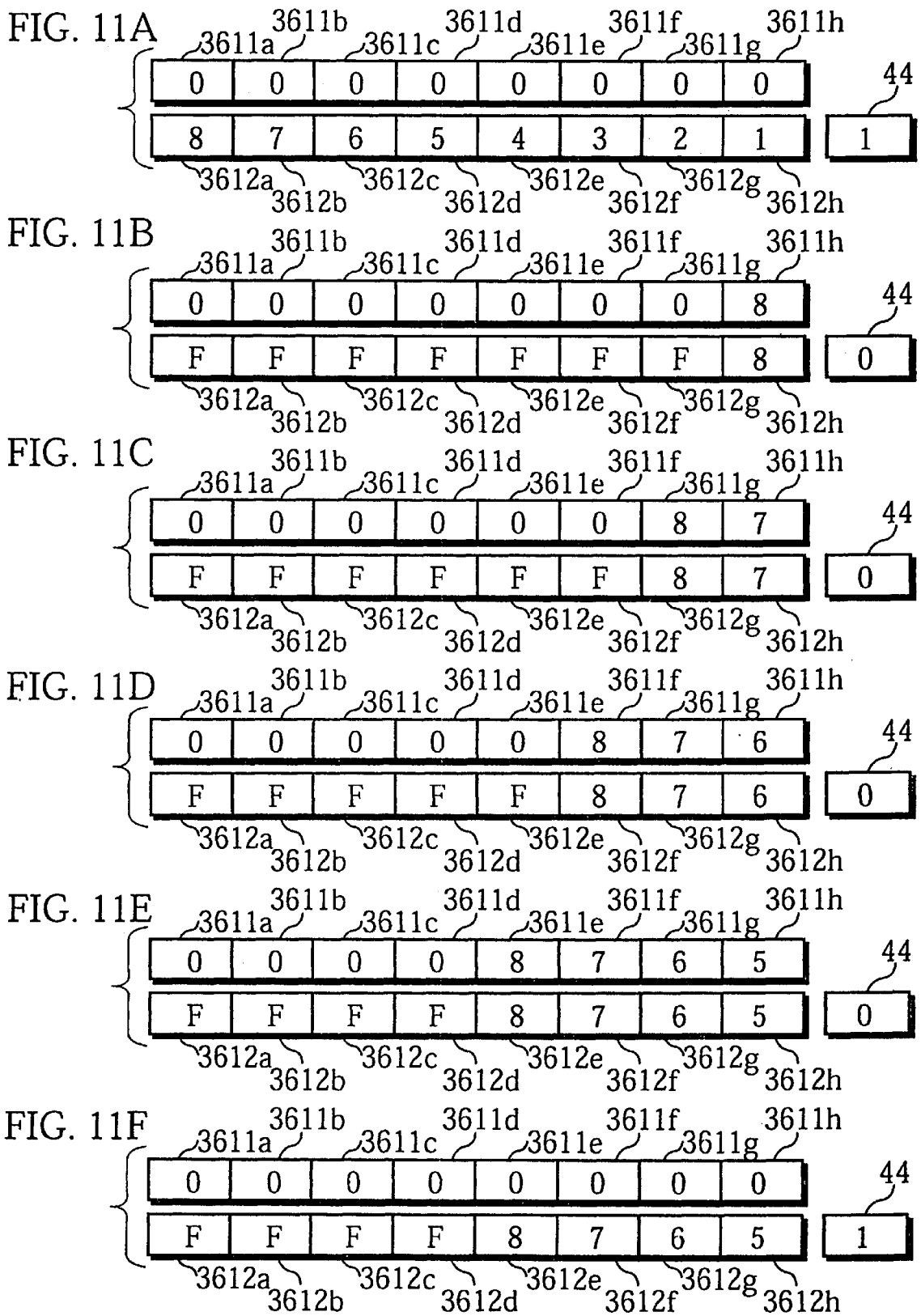
FIGS. 11A to 11F show a transition in the stored values of the zero-extended constant register 3611, the sign-extended constant register 3612, and the read flag storage unit 44.

FIG. 11A shows the state after a stored value of either of the zero-extended constant register 3611 and the sign-extended constant register 3612 has been read, with these registers storing the constant "0x87654321" as their initial state. Since the stored value of the zero-extended constant register 3611 is cleared whenever a value of either register is read, the content of the zero-extended constant register 3611 in FIG. 11A is "0x00000000". The content of the sign-extended constant register 3612 is not cleared, however. As shown in FIG. 11A, the value of the read flag in the read flag storage unit 44 is set at "1".

FIG. 11B shows the state when the value "0x8" has been stored with the registers in the state shown in FIG. 11A. This 4-bit value "0x8" is stored with a zero extension in the zero-extended constant register 3611 as the 32-bit value "0x00000008", and is stored with a sign extension in the sign-extended constant register 3612 as the 32-bit value "0xFFFFFFF8". At this point, the value of the read flag in the read flag storage unit 44 is cleared to "0".

FIG. 11C shows the state when the value "0x7" has been stored with the registers in the state shown in FIG. 11B. The 8-bit value composed of "0x8" and "0x7" is stored with a zero extension in the zero-extended constant register 3611 as the 32-bit value "0x00000087", and is stored with a sign extension in the sign-extended constant register 3612 as the 32-bit value "0xFFFFFF87". At this point, the value of the read flag in the read flag storage unit 44 is kept at "0".

FIG. 11D shows the state when the value "0x6" has been stored with the registers in the state shown in FIG. 11C. The 12-bit value composed of "0x8", "0x7", and "0x6" is stored with a zero extension in the zero-extended constant register 3611 as the 32-bit value "0x00000876", and is stored with a sign extension in the sign-extended constant register 3612 as the 32-bit value "0xFFFFF876". At this point, the value of the read flag in the read flag storage unit 44 is kept at "0".

FIG. 11E shows the state when the value "0x5" has been stored with the registers in the state shown in FIG. 11D. The 16-bit value composed of "0x8", "0x7", "0x6", "0x5" is stored with a zero extension in the zero-extended constant register 3611 as the 32-bit value "0x00008765", and is stored with a sign extension in the sign-extended constant register 3612 as the 32-bit value "0xFFFF8765". At this point, the value of the read flag in the read flag storage unit 44 is kept at "0".

FIG. 11F shows the state after the stored value of one of the zero-extended constant register 3611 and the sign-extended constant register 3612 has been read. Since the stored value of one of the registers has been read, the zero-extended constant register 3611 is cleared, though the stored value of the sign-extended constant register 3612 is not cleared. The value of the read flag in the read flag storage unit 44 is set at "1".

As can be seen from the preceding explanation, the sign extension control unit 43 uses the read flag of the read flag storage unit 44 to judge whether sign extension is to be performed, so that a constant which is divided and distributed across a plurality of instructions can be restored in the sign-extended constant register 3612 as a sign-extended constant.

Unlike the sign-extended constant register 3612, there is no need for the zero-extended constant register 3611 to use a flag to show whether the stored value should be extended. If the content of the zero-extended constant register 3611 is cleared every time a stored value is used, a constant which is divided and distributed across a plurality of instructions can be restored in the zero-extended constant register 3611 as a zero-extended constant.

The following is a description of a processor (hereinafter referred to as the "comparison processor") which is not equipped with a constant register for each kind of extension but which can output both sign-extended and zero-extended constants. This comparison processor will then be compared with the present processor.

Figure 12:
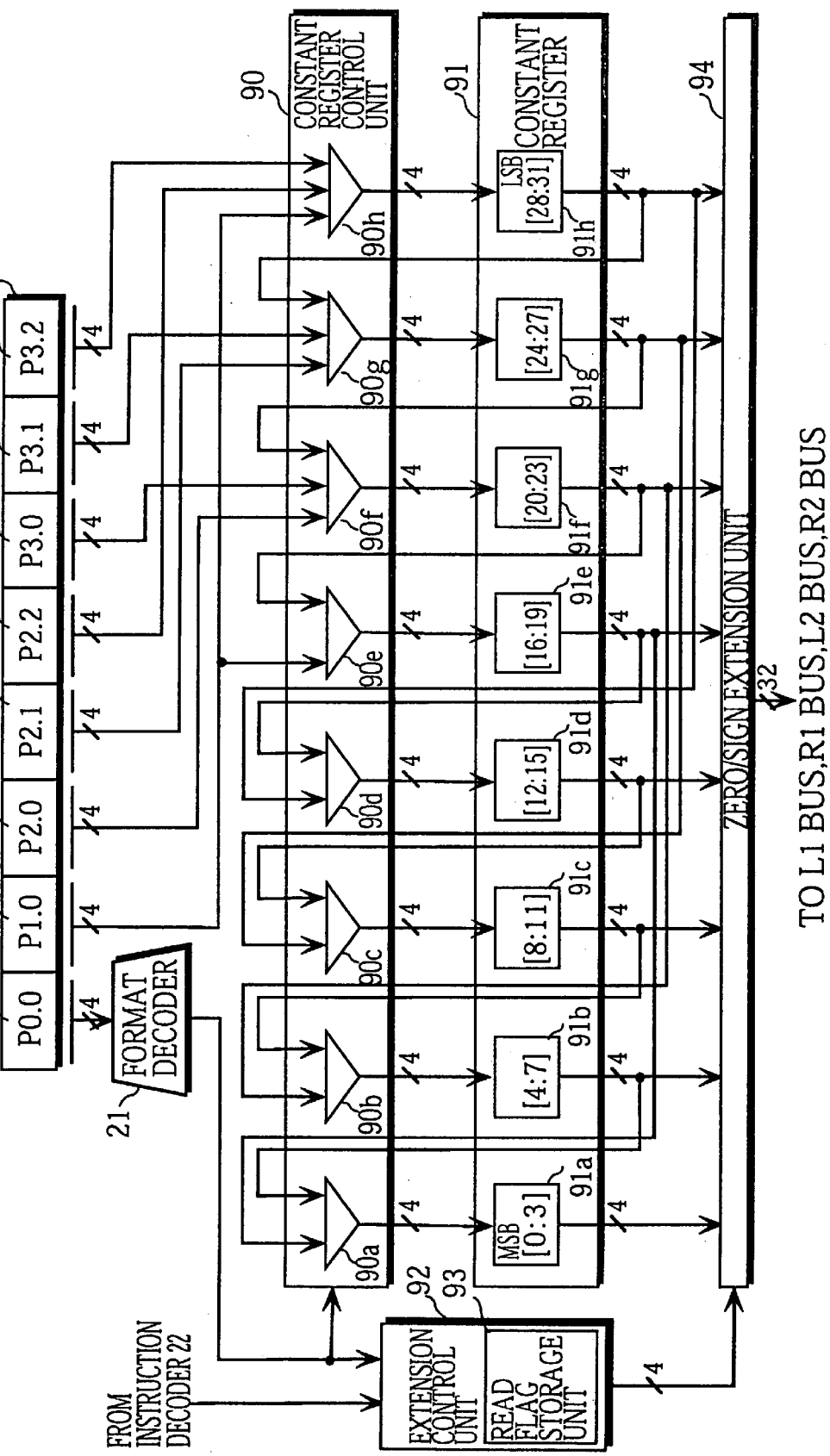
FIG. 12 is a block diagram showing the detailed construction and connection pattern of the constant register 91, which is able to output both sign-extended and zero-extended constants, and its peripheral circuits.

FIG. 12 is a block diagram showing the detailed construction and connection pattern of a constant register 91, which outputs either a sign-extended constant or a zero-extended constant, and the peripheral circuits.

The 8 input selectors for the constant register 91 that are included in the constant register control unit 90 are composed of 5 2-input selectors (90a~90e) and 3 3-input selectors (90f~90h). The constant register 91 is composed of 8 4-bit registers 91a~91h, with each of these being connected to an output of a corresponding input selector 90a~90h.

By controlling the 8 input selectors 90a~90h in accordance with control signals from the format decoder 21, the constant register control unit 90 has a constant in the instruction register 10 stored into the constant register 91 according to the same storage methods used for the zero-extended constant register 3611. The only difference with the storage methods used when storing a constant into the zero-extended constant register 3611 is that the constant register control unit 90 does not have all zeros stored into the constant register 91 when its stored value has been used.

The extension control unit 92 is equipped with a stored digit counter 93 for storing the number of digits in a valid constant that is presently stored in the constant register 91. When the stored value of the constant register 91 is read, the extension control unit 92 outputs an indication to the zero/sign extension unit 94 so that zero extension or sign extension is only performed for digits beyond the stored number of digits in the stored digit counter 93.

In accordance with control signals from the format decoder 21 and the instruction decoder 22, the zero/sign extension unit 94 performs sign extension or zero extension for the digits in the stored value of the constant register 91 beyond the stored number of digits.

As described above, once the stored value of the constant register 91 has been read, the zero/sign extension unit 94 performs zero extension or sign extension on the read value, with the overall processing of the comparison processor being delayed by the time taken by this extension processing. However, with the processor of the present invention, a constant register is provided for each extension method, so that such delays can be avoided.

The following is a detailed description of the construction of the PC unit 33.

Figure 13:
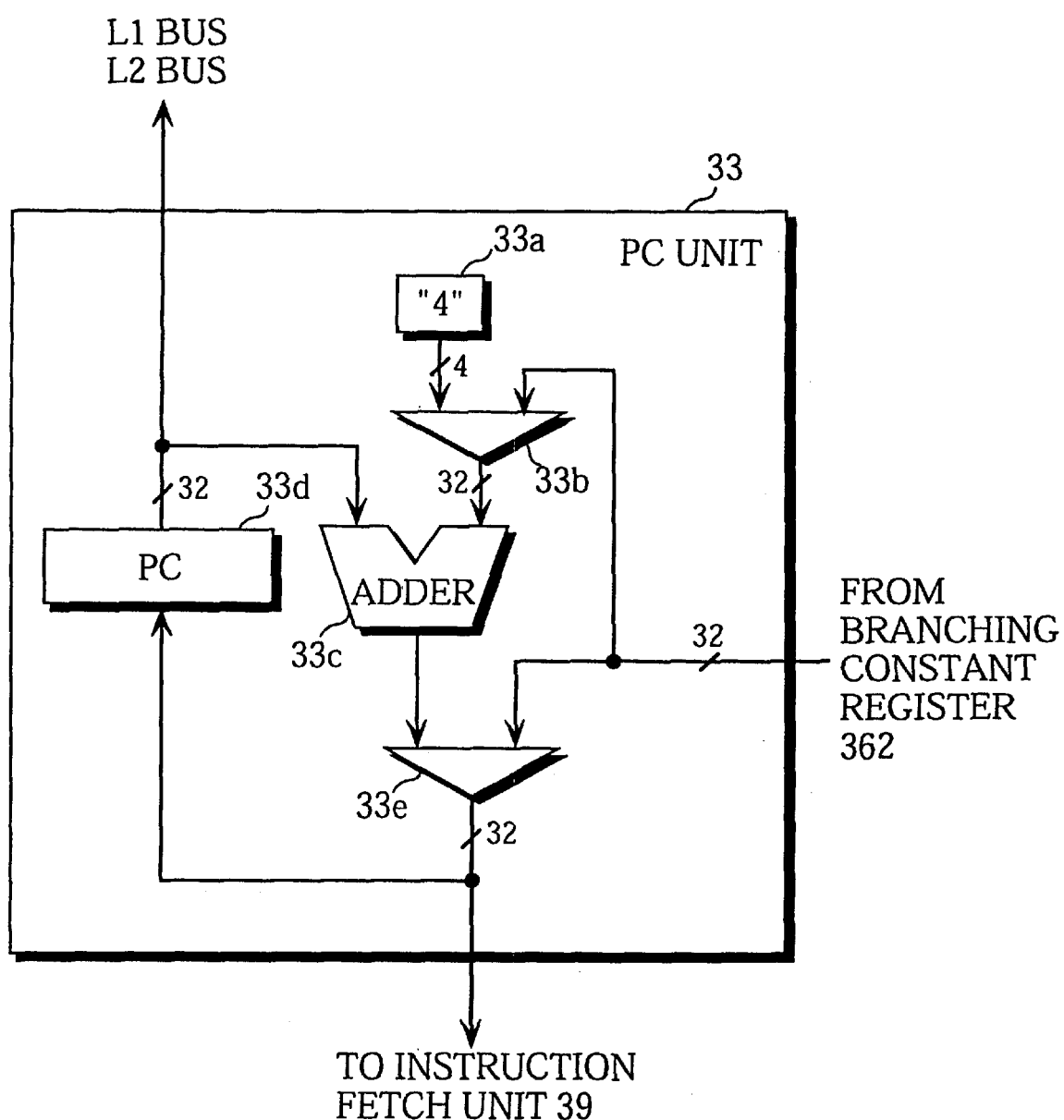
FIG. 13 is a block diagram showing the detailed construction of the PC unit 33.

FIG. 13 is a block diagram showing the construction of the PC unit 33 in detail. As shown in FIG. 13, the PC unit 33 is composed of a fixed value ("4") 33a, that is wiring which permanently carries the constant "4", a 2-input selector 33b, an adder 33c, a PC (Program Counter) 33d for storing an address of the next instruction to be decoded and executed, and a 2-input selector 33e.

In the PC unit 33, the selectors 33b and 33e operate in accordance with control signals from the decoder unit 20, so that the selector 33e outputs one of the following three types of values to the instruction fetch unit 39 as the effective address.

1. A Value Where "4" is Added to the Content of the PC 33d

This corresponds to when no branch is taken and a next instruction is to be executed in order, which is to say, when the decoding result for a present instruction is that no branch operation is indicated. The reason "4" is added is that the length of one instruction is four bytes, which is to say, 32bits.

2. A Value Where the Content of the Branching Constant Register 362 is Added to the Content of The PC 33d This corresponds to when the content of the branching constant register 362 is used as a relative address for branching, such as when the decoding result of the branch decoder 23 is that the P1.0 field 12 indicates a branch to a relative address.

3. A Value Given as the Content of the Branching Constant Register 362

This corresponds to when the content of the branching constant register 362 is used as an absolute address for branching, such as when the decoding result of the branch decoder 23 is that the P1.0 field 12 indicates a branch to an absolute address.

As described above, the PC unit 33 includes a specialized adder 33c, and is constructed to directly use the value stored by the branching constant register 362, so that branch execution control can be performed with the stored value of the branching constant register 362 as a relative address or an absolute address in parallel with and independent of the operations performed by the first operation unit 37 and the second operation unit 38.

Operation of the Processor

The following is a description of the operation of the present processor when decoding and executing specific operations.

Figure 14:
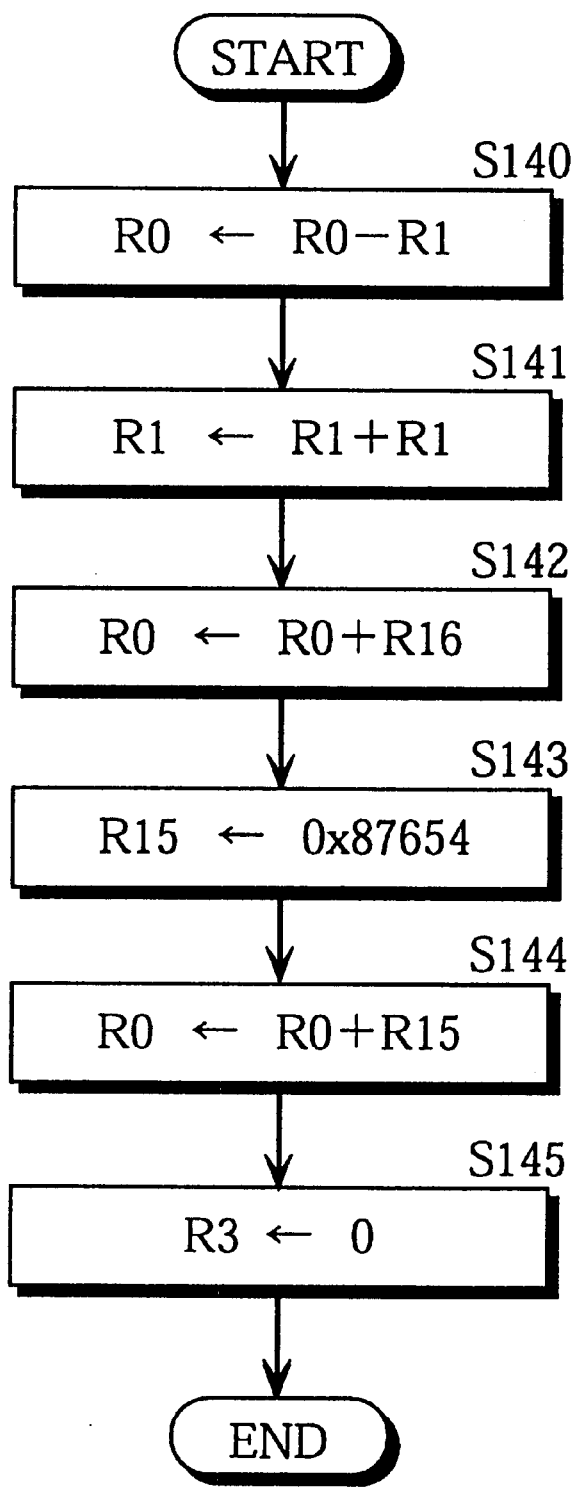
FIG. 14 is a flowchart showing an example procedure that deals with a 32-bit constant.

FIG. 14 is a flowchart showing an example of a procedure that handles 32-bit constants. First, the difference between the stored values of the registers R0 and R1 is found (step S140), and "1" is added to the stored value of the register R1 (step S141). The stored value of the register R0 is multiplied by the stored value of the register R2 (step S142), and the 20-bit constant "0x87654" is added to multiplication result (steps S143, S144). Finally, the register R3 is cleared (step S145).

FIG. 15 shows an example of a program that has the present processor perform the procedure shown in FIG. 14. The program is composed of the three instructions 71–73. In FIG. 15, one line corresponds to one instruction, the content of each instruction is shown by mnemonics located in the separate fields of each instruction, and the value of each constant is expressed in hexadecimal. Also, the legend "fmtn (n=0~F)" shows the format code "n", while the legend "Rn (n=0~15)" shows the value stored in one of the registers in the register set 34. Of these, "R15" refers to the operation constant register 361.

The nature of operation that is to be performed determines which of the zero-extended constant register 3611 and the sign-extended constant register 3612 in the operation constant register 361 is to have its stored value used in the operation.

Figure 16:
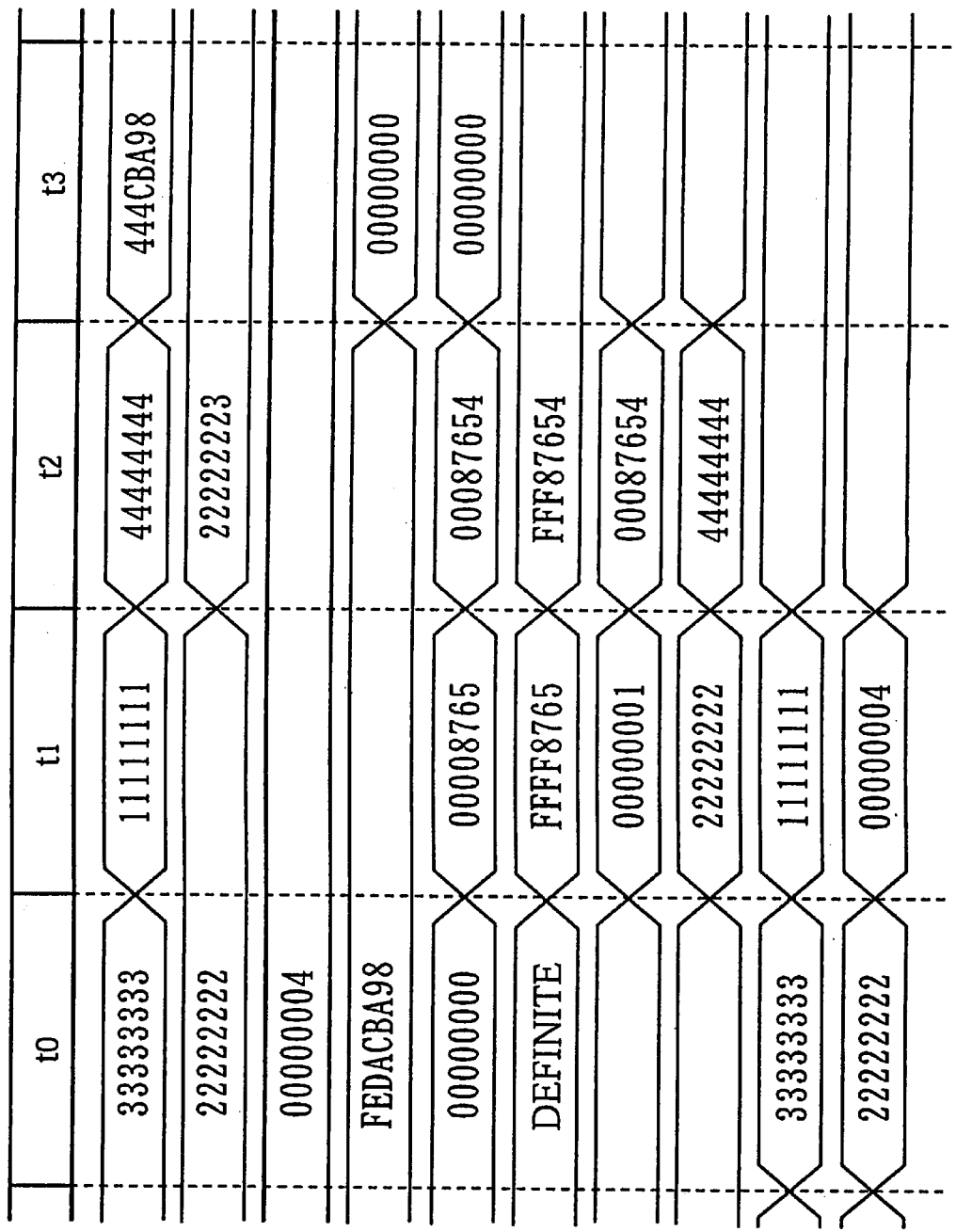
FIG. 16 is a timing chart showing the operation of the present processor when executing the program shown in FIG. 15.

FIG. 16 is a timing chart showing the operation of the present processor when executing the program shown in FIG. 15. This FIG. 16 shows the clock cycles, the content of the general registers R0–R3 and the register R15 (composed of the zero-extended constant register 3611 and the sign-extended constant register 3612), and the data that flows on the four buses L1, R1, L2, and R2.

The following is an explanation of the operation of the present processor for each of the instructions 71 to 73, with reference to FIGS. 15 and 16.

Instruction 71

After the instruction 71 has been loaded into the instruction register 10, the present processor performs the operations shown in the clock cycles t0–t1 in FIG. 16. The format decoder 21 judges from the value "fmt6" of the P0.0 field 11 in the instruction register 10 that the present instruction is a twin operation instruction with the format code "6", and so controls the execution unit 30 so that the two operations described below are executed in parallel.

1. First Operation

The constant register control unit 32 controls its eight internal input selectors 32i–32p so that the 16-bit constant "0x8765" located between the P1.0 field 12 to the P2.2 field 15 is stored in the lower 16 bits of the zero-extended constant register 3611 according to the storage method shown in FIG. 7B. Accordingly, the content of the zero-extended constant register 3611 changes from "0x00000000" to "0x00008765" as shown in the clock cycles t0–t1 in FIG. 16.

At the same time, the constant register control unit 32 controls its eight input selectors 32q–32x so that the 16-bit constant "0x8765" located between the P1.0 field 12 to the P2.2 field 15 is sign-extended and stored in the sign-extended constant register 3612. Accordingly, the content of the sign-extended constant register 3612 changes to "0xFFFF8765" as shown in the clock cycles t0–t1 in FIG. 16.

2. Second Operation

The second operation unit 38 receives an input of the stored value "0x33333333" of the general register R0 and the stored value "0x22222222" of the general register R1, and after subtracting the latter from the former, stores the result in the general register R0. As a result, the stored content of the general register R0 changes from the value "0x333333331" to the value "0x11111111" in the clock cycles t0–t1 shown in FIG. 16.

Instruction 72

Next, after the instruction 72 has been loaded into the instruction register 10, the present processor operates as shown in clock cycles t1–t2 in FIG. 16. The format decoder 21 judges from the value "fmt1" of the P0.0 field 11 in the instruction register 10 that the present instruction is a triple operation instruction with the format code "1", and so controls the execution unit 30 so that the three operations described below are executed in parallel.

1. First-Operation

The constant register control unit 32 controls its eight internal input selectors 32i–32p so that the 4-bit constant "0x4" located in the P1.0 field 12 is stored in the lower 4bits of the zero-extended constant register 3611 according to the storage method shown in FIG. 7A. Accordingly, the content of the zero-extended constant register 3611 changes from "0x00008765" to "0x00087654" as shown in the clock cycles t1–t2 in FIG. 16.

At the same time, the constant register control unit 32 controls its eight input selectors 32q–32z so that the 4-bit constant "0x4" located in the P1.0 field 12 is stored in the lowest 4-bits of the sign-extended constant register 3612. Accordingly, the content of the sign-extended constant register 3612 changes from "0xFFFF8765" to "0xFFF87654" as shown in the clock cycles t1–t2 in FIG. 16.

2. Second Operation

The first operation unit 37 receives an input of the stored value "0x22222222" of the general register R1 and the constant "0x1" indicated by the P2.1 field, adds these values together, and stores the result into the general register R1. As a result, the content of the general register R3 changes from "0x22222222" to "0x22222223" in the clock cycles t1–t2 shown in FIG. 16.

3. Third Operation

The second operation unit 38 receives an input of the stored value "0x11111111" of the general register R0 and the stored value of the general register R2 "0x00000004", multiplies the inputted values together, and stores the result in the general register R0. As a result, the content of the general register R0 changes from "0x11111111" to "0x44444444" in the clock cycles t1–t2 shown in FIG. 16.

Instruction 73

Next, after the instruction 73 has been loaded into the instruction register 10, the present processor operates as shown in clock cycles t2–t3 in FIG. 16. The format decoder 21 judges from the value "fmtB" of the P0.0 field 11 in the instruction register 10 that the present instruction is a twin operation instruction with the format code "B", and so controls the execution unit 30 so that the two operations described below are executed in parallel.

1. First Operation

Since the operation is an "add" that uses a zero-extended immediate as an operand, the first operation unit 37 selects the content "0x00087654" of the zero-extended constant register 3611 as the constant for the operation. The content of the zero-extended constant register 3611 and the content "0x44444444" of the general register R0 are inputted into the first operation unit 37 which, after adding the values together, stores the addition result into the general register R0. As a result, the stored content of the general register R0 changes from the value "0x44444444" to the value "0x444CBA98" in the clock cycles t2–t3 shown in FIG. 16. The content of the zero-extended constant register 3611 is cleared at this point.

2. Second Operation

The second operation unit 38 receives an input of the 8-bit constant ("0x00") that is located in the P1.0 field 12 and the P3.1 field 17 and allows this constant to pass so that it is stored in the general register R3. As a result, the content of the general register R3 changes from the previously held value "0xFEDCBA98" to "0x00000000", as shown for the clock cycles t2–t3 in FIG. 16.

As described above for the present processor, the 20-bit constant "0x87654" is split into two parts that are arranged into the two instructions 71 and 72, with these parts being successively stored in the operation constant register 361 by shifting its stored value. This stored constant is then used by the third instruction, instruction 73. By doing so, the procedure shown in the flowchart of FIG. 14 can be executed by the three instructions 71–73.

The following is an explanation of the operation of the present processor using a different program including a branch.

Figure 17:
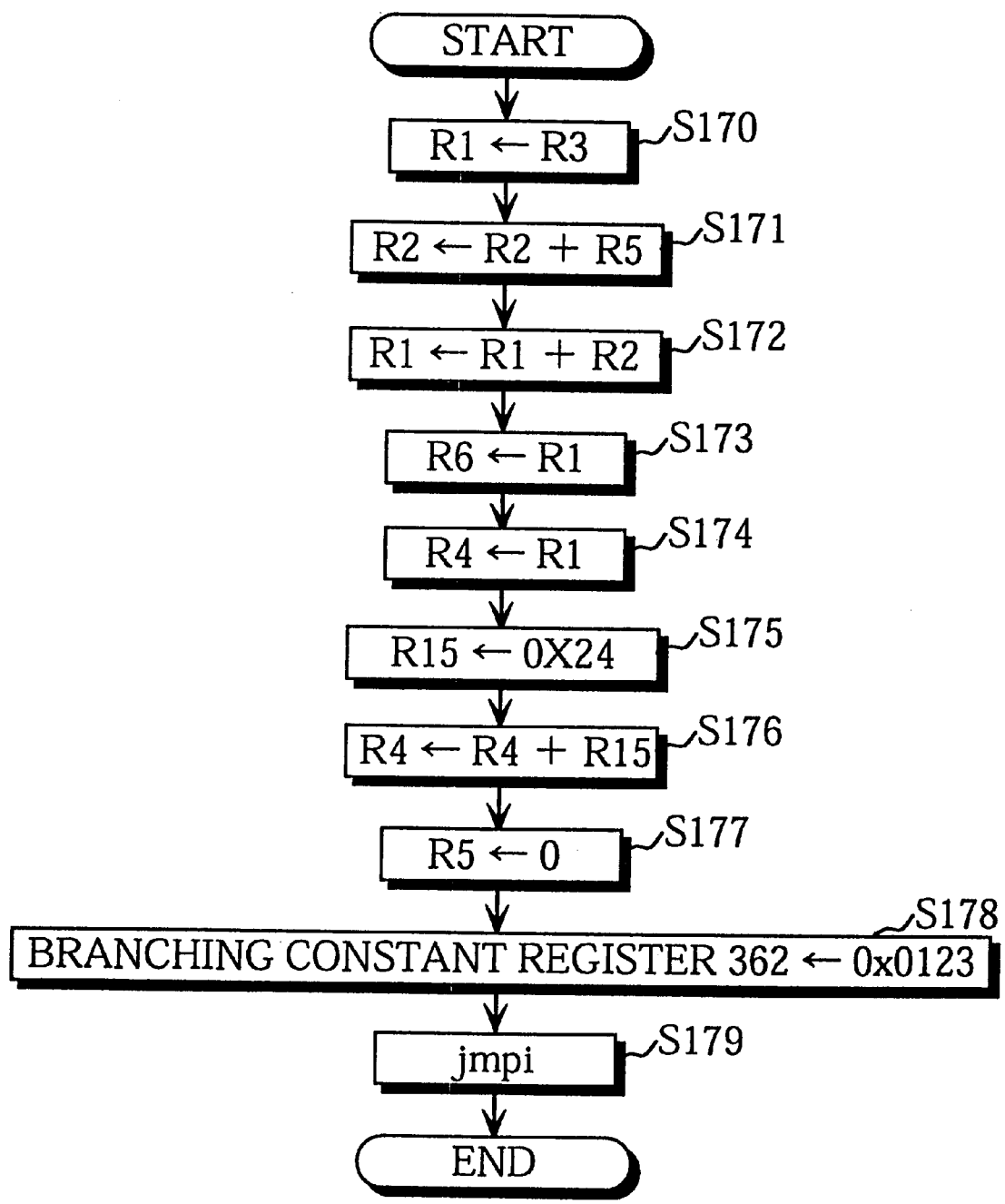
FIG. 17 is a flowchart showing an example procedure that deals with a 32-bit constant.

FIG. 17 is a flowchart showing an example procedure that uses a 32-bit constant.

In FIG. 17, the stored value of the general register R3 is first transferred to the general register R1 (step S170). The stored value of the general register R2 and the stored value of the general register R5 are then added (step S171), and the stored value of the general register R1 is added to the stored value of the general register R2 (step S172). The stored value or the general register R1 is then transferred first to the general register R6 (step S173) and then to the general register R4 (step S174). The 8-bit constant "0x24" is then added to the stored value of the general register R4 (steps S175, S176), the stored value of the general register R5 is cleared, (step S177), and finally the an unconditional branch is taken to the relative address "0x0123" (steps S178, S179), where "0x0123" is "0123" in hexadecimal.

FIG. 18 shows an example of a program that has the present processor perform the procedure shown in FIG. 17. The program is composed of the four instructions 74–77. In FIG. 18, one line corresponds to one instruction, the content of each instruction is shown by mnemonics located in the separate fields of each instruction, and the value of each constant is expressed in hexadecimal. Also, the legend "fmtn (n=0~F)" shows the format code "n", while the legend "Rn (n=0~14)" shows the value stored in one of the registers in the register set 34. The legend "R15" meanwhile refers to the operation constant register 361.

The following is a description of the operation of the present processor for each of the instructions 74 to 77.

Instruction 74

After the instruction 74 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.

1. First Operation

The constant register control unit 32 controls its eight internal input selectors 32i–32p so that the 4-bit constant "0x2" located in the P1.0 field 12 is stored in the lower 4bits of the zero-extended constant register 3611 according to the storage method shown in FIG. 7A. Accordingly, the content of the zero-extended constant register 3611 changes from "0x00000000" to "0x00000002".

At the same time, the constant register control unit 32 controls its eight input selectors 32q–32z so that the 4-bit constant "0x2" located in the P1.0 field 12 is sign-extended and stored in the sign-extended constant register 3612. Accordingly, the content of the sign-extended constant register 3612 changes to "0x00000002".

2. Second Operation

The first operation unit 37 receives an input of the stored value of the general register R3 and allows the value to pass through so that it is stored into the general register R1.

3. Third Operation

The second operation unit 38 receives an input of the stored value of the general register R5 and allows the value to pass through so that it is stored into the general register R2.

Instruction 75

After the instruction 75 has been loaded into the instruction register 10, the format decoder 21 judges from the value "fmt7" of the P0.0 field 11 in the instruction register 10 that the present instruction is a twin operation instruction with the format code "7", and so controls the execution unit 30 so that the two operations described below are executed in parallel.

1. First Operation

The constant register control unit 32 controls its eight internal input selectors 32a–32h so that the 16-bit constant "0x0123" located between the P1.0 field 12 to the P2.2 field 15 is stored in the lower 16bits of the branching constant register 362 according to the storage method shown in FIG. 7B. Accordingly, the content of the branching constant register 362 changes from "0x00000000" to "0x00000123".

2. Second Operation

The second operation unit 38 receives an input of the stored value of the general register R1 and the stored value of the general register R2, adds the values together, and stores the result in the general register R1.

Instruction 76

After the instruction 76 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.

First Operation

The constant register control unit 32 controls its eight internal input selectors 32i–32p so that the 4-bit constant "0x4" located in the P1.0 field 12 is stored in the lower 4bits of the zero-extended constant register 3611 according to the storage method shown in FIG. 7A. Accordingly, the content of the zero-extended constant register 3611 changes from "0x00000002" to "0x00000024".

At the same time, the constant register control unit 32 controls its eight internal input selectors 32q–32x so that the 4-bit constant "0x4" located in the P1.0 field 12 is stored in the lower 4bits of the sign-extended constant register 3612 according to the storage method shown in FIG. 7A. Accordingly, the content-of the sign-extended constant register 3612 changes from "0x00000002" to "0x00000024".

2. Second Operation

The first operation unit 37 receives an input of the stored value of the general register R1 and allows the value to pass through so that it is stored into the general register R4.

3. Third Operation

The second operation unit 38 receives an input of the stored value of the general register R1 and allows the value to pass through so that it is stored into the general register R6.

Instruction 77

After the instruction 77 has been loaded into the instruction register 10, the format decoder 21 judges from the value "fmt5" of the P0.0 field 11 in the instruction register 10 that the present instruction is a triple operation instruction with the format code "5", and so controls the execution unit 30 so that the three operations described below are executed in parallel.

1. First Operation

The operation "jmpi" represents an unconditional jump to a relative address, so that the PC unit 33 receives an input of the stored value "0x00000123" of the branching constant register 362 and adds this value to the content of the PC 33d. The resulting value is then outputted from the selector 33e to the instruction fetch unit 39 as the valid address.

2. Second Operation

The first operation unit 37 receives an input of the constant "0x0" and allows this value to pass so that it is stored into the general register R5.

3. Third Operation

Since the operation is an "add" that uses a zero-extended immediate as an operand, the second operation unit 38 selects the content "0x00000024" of the zero-extended constant register 3611 as the constant for the operation. The content of the zero-extended constant register 3611 and the stored value of the general register R4 are inputted into the second operation unit 38 which, after adding the values together, stores the addition result into the general register R4.

As a result of the above operation, the present processor is able to progressively shift and accumulate pieces of the 8-bit constant "0x24", which are provided in the instructions 74 and 76, in the operation constant register 361. This restored constant is used by the fourth instruction, instruction 77. The branching constant "0x0123", meanwhile, is provided in instruction 75, and after being stored into the branching constant register 362, this constant is also used by the fourth instruction, instruction 77. By doing so, the procedure shown by the flowchart in FIG. 17 is executed by the four instructions 74–77.

Comparison With When Only One Constant Register is Used

The following is a comparison of the present processor with a processor that is provided with only one constant register.

FIG. 19 shows an example of a program for having a processor equipped with only one constant register execute the procedure shown in FIG. 17. This processor is hereinafter referred to as the "comparison processor", while the processor of the present invention is referred to as the "present processor".

As can be seen from FIG. 19, this program is composed of five instructions 78 to 82. In FIG. 19, one line corresponds to one instruction, the content of each instruction is shown by mnemonics located in the separate fields of each instruction, and the value of each constant is expressed in hexadecimal. Also, the legend "fmtn (n=0~F)" shows the format code "n", while the legend "Rn (n=0~14)" shows the value stored in one of the registers in the register set 34. The legend "R15" meanwhile refers to the single constant register provided in the comparison processor.

The operations of the comparison processor for each of the instructions 78 to 82 are the same as the operations performed by the present processor for instructions 74 to 77, and so will not be explained. In FIG. 19, the legend "nop" represents a "nop" (no operation) code.

For the comparison processor, the 8-bit constant "0x24" is divided between the instructions 78 and 79 and is accumulated in the single constant register before being used by the fourth instruction, instruction 81. The branching constant "0x0123" is also provided in the instruction 81, so that this value is stored in the constant register and then used by the fifth instruction, instruction 82. By doing so, the procedure shown in FIG. 17 is achieved by the five instructions 78 to 82.

As can be seen by comparing FIG. 18 and FIG. 19, the program for having the comparison processor execute the procedure shown in FIG. 17 includes one more instruction than the program for the present processor.

The reason for the above difference is that when a constant for use in an operation has been stored in the single constant register of the comparison processor, a constant for use during branching cannot be stored until the constant for use in an operation has been used. This creates a limitation on the execution order of instructions, so that a "nop" no-operation code has to be inserted.

As described above, the processor of the present invention is able to separately accumulate a constant for use during branching and a constant for use in an operation. As a result, the insertion of "nop" codes due to conflicts over the use of a single constant register can be avoided, thereby reducing code size of the program.

The processor of the present invention has been described above by means of a single embodiment, although it should be obvious that the present invention is not limited to the example given above. Further variations are described below.

(1) Arithmetic logic operations are classified in the embodiment into operations that use a zero-extended constant and operations that use a sign-extended constant, although the present invention is not limited to the classification given above. As one example, logic operations such as "and" (logical AND), "or" (logical OR), and "cmp" (comparison) may be classified as operations that use zero-extended constants, with arithmetic operations such as "add" (addition), "sub" (subtraction), and "mul" (multiply) being classified as operations that use sign-extended constants.

(2) in the above embodiment, zero-extended constants and sign-extended constants are stored, although the extension method used is not limited to these two. As an alternative, any combination of a sign-extended format, a zero-extended format, an absolute value format, a 1's complement format, a 2's complement format, an excess ($2^{(n-1)}$) format, a floating-point format, a packed format, and an unpacked format may be used.

(3) As can be seen from the instruction formats shown in FIGS. 2B to 2D of the above embodiment, only a 4-bit or a 16-bit constant can be stored in the constant register 36 by a single instruction in the above embodiment, although this is not a limitation for the present invention. As examples, it is equally possible to define an instruction format whereby a 12-bit or a 28-bit constant can be stored in the constant register 36 by a single instruction. To do so, it is only necessary to change the connection pattern of the peripheral circuit of the constant register 36.

(4) The constant register of the processor in the above embodiment is described as being composed of the operation constant register 361 and the branching constant register 362 so that it is able to separately store two kinds of constants, although there is no particular limitation on the number of constant registers provided in a processor of the present invention. As one example, the processor may include three constant registers composed of an operation constant register A, a constant register B, and a branching constant register, with the processor being able to separately store three kinds of constants in these three constant registers. By doing so, more precise management of constants is possible.

(5) In the present embodiment, the selection as to which of the zero-extended constant register 3611 and the sign-extended constant register 3612 has its stored value used in an operation is performed according to the operation using the stored value, although this may be decided using an operand instead. As one example, register R14 may be set as a register for storing a zero-extended constant and register R15 may be set as a register for storing a sign-extended constant, with the register to be used being decided according to a register designation given in the operation. By doing so, it is no longer necessary to provide operations for each extension method, so that a single operation may use a constant that has been extended according to either method.

(6) The processor described in the above embodiment is constructed so that the branching constant register 362 is a single register, although it should be obvious that any number of registers may be provided as the branching constant register 362. As one example, a branching constant register for storing a sign-extended constant and a branching constant register for storing a zero-extended constant may be provided, with a constant for use in a branching operation being stored in both constant registers having been given appropriate extensions for the respective registers. When a branch to a relative address is performed, the stored value of the register with the sign-extended constant may be used, while when a branch to an absolute address is performed, the stored value of the register with the zero-extended constant may be used. By doing so, a negative value may be used as a relative address (displacement), which means that relative branches to preceding parts of a program can be easily achieved.

(7) The processor of the present embodiment is described as a VLIW processor that has two operation units, 37 and 38, although the present invention may, of course, also be applied to a processor without VLIW architecture that includes only one operation unit and processes instructions that only specify a single instruction.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor for executing operations based on instructions, the processor comprising:

an instruction register for storing an instruction;

first constant storage means including a first storage area;

second constant storage means including a second storage area;

decoding means for decoding the instruction stored in the instruction register and for giving an indication of one of four cases listed below (1) a first case where the instruction includes a first constant to be stored into the first constant storage means, (2) a second case where the instruction includes a second constant to be stored into the second constant storage means, (3) a third case where a constant stored in the first constant storage means is to be used in an operation, and (4) a fourth case where a constant stored in the second constant storage means is to be used in an operation;

constant transfer means for operating as follows (a) when the decoding means indicates the first case and no valid constant is stored in the first constant storage means, the constant transfer means transfers the first constant from the instruction register to the first constant storage means and sets the transferred first constant in the first constant storage means as a valid constant, (b) when the decoding means indicates the first case and a valid constant is stored in the first constant storage means, the constant transfer means transfers the first constant from the instruction register to the first constant storage means so as to retain the valid constant, links the first constant and the valid constant in the first constant storage means, and sets a linking result as a new valid constant, and (c) when the decoding means indicates the second case and no valid constant is stored in the second constant storage means, the constant transfer means transfers the second constant from the instruction register to the second constant storage means and sets the transferred second constant in the second constant storage means as a valid constant, (d) when the decoding means indicates the second case and a valid constant is stored in the second constant storage means, the constant transfer means transfers the second constant from the instruction register to the second constant storage means so as to retain the valid constant, links the second constant and the valid constant in the second constant storage means, and sets a lining result as a new valid constant; and execution means for operating as follows (i) when the decoding means indicates the third case, the execution means reads the linked constant stored in the first constant storage means and executes the operation using the read constant as an operand, and (ii) when the decoding means indicates the fourth case, the execution means reads the linked constant stored in the second constant storage means and executes the operation using the read constant as an operand.

2. The processor of claim 1, wherein the decoding means indicates one of the third case and the fourth case based on an operation code for an operation that is included in the instruction in the instruction register.

3. The processor of claim 2, wherein the decoding means indicates the third case when an operation code shows a branch operation and the fourth case when an operation code shows an arithmetic logic operation, the first constant storage means being provided specially for branch operations and the second constant storage means being provided for arithmetic logic operations.

4. The processor of claim 3, wherein in the first case, the constant transfer means has a valid value stored in the first constant storage means shifted by a number of bits in the first constant, transfers the first constant from the instruction register to a free space in the first constant storage means produced by shifting the valid value, and so links the first constant with the valid value in the first constant storage means, and in the second case, the constant transfer means has a valid value stored in the second constant storage means shifted by a number of bits in the second constant, transfers the second constant from the instruction register to a free space in the second constant storage means produced by shifting the valid value, and so links the second constant with the valid value in the second constant storage means.

5. The processor of claim 3, wherein the constant transfer means stores first state data showing whether a valid constant is stored in the first constant storage means and second state data showing whether a valid constant is stored in the second constant storage means, and:

in the first case, after transferring the first constant from the instruction register to the first constant storage means, the constant transfer means changes the first state data to show that a valid constant is stored in the first constant storage means;

in the second case, after transferring the second constant from the instruction register to the second constant storage means, the constant transfer means changes the second state data to show that a valid constant is stored in the second constant storage means;

in the third case, when the execution means has read the constant stored in the first constant storage means, the constant transfer means clears the first storage region and changes the first state data to show that no valid constant is stored in the first constant storage means; and in the fourth case, when the execution means has read the constant stored in the second constant storage means, the constant transfer means clears the second storage region and changes the second state data to show that no valid constant is stored in the second constant storage means.

6. The processor of claim 1, wherein the decoding means indicates one of the third case and the fourth case based on operands included in the instruction in the instruction register.

7. A processor for executing operations based on instructions, the processor comprising:

an instruction register for storing an instruction;

first constant storage means including a first storage area;

second constant storage means including a second storage area;

decoding means for decoding the instruction stored in the instruction register and for giving an indication of one of four cases listed below—

(1) a first case where the instruction includes a first constant to be stored into the first constant storage means, (2) a second case where the instruction includes a second constant to be stored into the second constant storage means, (3) a third case where a constant stored in the first constant storage means is to be used in an operation, and (4) a fourth case where a constant stored in the second constant storage means is to be used in an operation;

constant transfer means for storing first state data showing whether a constant has been read from the first constant storage means and second state data showing whether a constant has been read from the second constant storage means, and for operating as follows (a) when the decoding means indicates the first case and the first state data shows that a constant has been read from the first constant storage means, the constant transfer means clears the first storage region, transfers the first constant from the instruction register to the first constant storage means, and sets the first state data to show that a constant has not been read from the first constant storage means, (b) when the decoding means indicates the first case and the first state data shows that a constant has not been read from the first constant storage means, the constant transfer means transfers the first constant from the instruction register to the first constant storage means without deleting a valid constant that is stored in the first constant storage means, links the first constant and the valid constant in the first constant storage means, and sets a linking result as a new valid constant, (c) when the decoding means indicates the second case and the second state data shows that the constant has been read from the second constant storage means, the constant transfer means clears the second storage region, transfers the second constant from the instruction register to the second constant storage means, and sets the second state data to show that a constant has not been read from the second constant storage means, (d) when the decoding means indicates the second case and the second state data shows that a constant has not been read from the second constant storage means, the constant transfer means transfers the second constant from the instruction register to the second constant storage means without deleting a constant that is stored in the second constant storage means, links the second constant and a valid constant in the second constant storage means, and sets a linking result as a new valid constant; and execution means for operating as follows (i) when the decoding means indicates the third case, the execution means reads the linked constant stored in the first constant storage means and executes the operation using the read constant as an operand, (ii) when the decoding means indicates the fourth case, the execution means reads the linked constant stored in the second constant storage means and executes the operation using the read constant as an operand, wherein in the third case, after the execution means reads the linked constant stored in the first constant storage means, the constant transfer means sets the first state data to show that the constant has been read from the first constant storage means, and in the fourth case, after the execution means reads the linked constant stored in the second constant storage means, the constant transfer means sets the second state data to show that the constant has been read from the second constant storage means.

8. A processor for executing operations based on instructions, the processor comprising:

an instruction register for storing an instruction;

first constant storage means including a first storage region for storing a constant in a first format;

second constant storage means including a second storage region for storing the constant in a second format;

decoding means for decoding the instruction stored in the instruction register and indicating one of three cases given below (1) a first case where the instruction includes a storage constant that is to be stored in the first constant storage means and the second constant storage means, (2) a second case where the constant in the first format is used in an operation, and (3) a third case where the constant in the second format is used in an operation;

constant transfer means for operating as follows (a) when the decoding means gives an indication of the first case and no valid constant is stored in the first constant storage means and the second constant storage means, the constant transfer means transfers the storage constant from the instruction register to the first constant storage means and the second constant storage means, and for setting the transferred storage constant in the first constant storage means and the second constant storage means as valid constants;

(b) when the decoding means gives an indication of the first case and a valid constant is stored in the first constant storage means and the second constant storage means, the constant transfer means transfers the storage constant from the instruction register to the first constant storage means and the second constant storage means so that the valid constants are not deleted, links the transferred storage constant with the valid constant in the first constant storage means and the valid constant in the second constant storage means, and sets linking results for the first constant storage means and the second constant storage means as valid constants; and execution means for reading, when the decoding means gives an indication of the second case, the linked constant stored in the first constant storage means and executing the operation using the read constant, and for reading, when the decoding means gives an indication of the third case, the linked constant stored in the second constant storage means and executing the operation using the read constant.

9. The processor of claim 8, wherein the first format is a zero-extended format and the second format is a sign-extended format.

10. The processor of claim 9, wherein in the first case, the constant transfer means has a valid constant stored in the first constant storage means shifted by a number of bits in the storage constant, transfers the storage constant into a blank space that is produced by a shifting, and links the storage constant with the valid constant in the first constant storage means, and in the second case, the constant transfer means has a valid constant stored in the second constant storage means shifted by a number of bits in the storage constant, transfers the storage constant into a blank space that is produced by a shifting, and links the storage constant with the valid constant in the second constant storage means.

11. The processor of claim 9, wherein the constant transfer means stores state data showing whether a valid constant is stored in the first constant storage means and the second constant storage means, and in the first case, after transferring the storage constant from the instruction register to the first constant storage means and the second constant storage means, the constant transfer means changes the state data to show that a valid constant is stored in the first constant storage means and the second constant storage means, in the second case, after the execution means has read the constant from the first constant storage means, the constant transfer means clears the first constant storage means and the second constant storage means and changes the state data to show that no valid constant is stored in the first constant storage means and the second constant storage means, and in the third case, after the execution means has read the constant from the second constant storage means, the constant transfer means clears the first constant storage means and the second constant storage means and changes the state data to show that no valid constant is stored in the first constant storage means and the second constant storage means.

12. The processor of claim 8, wherein the first format and the second format are a combination of any two of: a zero-extended format; a sign-extended format; an absolute value format; a 1's complement format; a 2's complement format; an excess $2^{(n-1)}$ format; a floating-point format; a pack format; and an unpack format.

13. The processor of claim 8, wherein the decoding means gives an indication for one of the second case and the third case based on an operation code for an operation that is included in the instruction in the instruction register.

14. The processor of claim 8, wherein the decoding means gives an indication for one of the second case and the third case based on an operand that is included in the instruction in the instruction register.

15. A processor for executing operations based on instructions, the processor comprising:

an instruction register for storing an instruction;

first constant storage means including a first storage region for storing a constant in a first format;

second constant storage means including a second storage region for storing the constant in a second format;

decoding means for decoding the instruction stored in the instruction register and indicating one of three cases given below (1) a first case where the instruction includes a storage constant that is to be stored in the first constant storage means and the second constant storage means, (2) a second case where the constant in the first format is used in an operation, and (3) a third case where the constant in the second format is used in an operation;

constant transfer means for storing state data showing whether a constant has been read from either of the first constant storage means and the second constant storage means, and for operating as follows (a) when the decoding means gives an indication of the first case and the state data shows that a constant has been read from one of the first constant storage means and the second constant storage means, the constant transfer means clears the first constant storage means and the second constant storage means, transfers the storage constant from the instruction register to the first constant storage means and the second constant storage means, and changes the state data to show that a constant has not been read from either of the first constant storage means and the second constant storage means, and (b) when the decoding means gives an indication of the first case and the state data shows that a constant has not been read from one of the first constant storage means and the second constant storage means, the constant transfer means transfers the storage constant from the instruction register to the first constant storage means and the second constant storage means so that the respective constants in the first constant storage means and the second constant storage means are not deleted, links the transferred storage constant with the valid constant in the first constant storage means and with the valid constant in the second constant storage means, and sets respective linking results as new constants; and execution means for reading, when the decoding means gives an indication of the second case, the linked constant stored in the first constant storage means and executing the operation using the read constant, and for reading, when the decoding means gives an indication of the third case, the linked constant stored in the second constant storage means and executing the operation using the read constant, wherein in the second case, after the linked constant in the first constant storage means has been read by the execution means, the constant transfer means clears the first storage region and the second storage region, and changes the state data to show that a constant has been read from one of the first constant storage means and the second constant storage means, and in the third case, after the linked constant in the first constant storage means has been read by the execution means, the constant transfer means clears the first storage region and the second storage region, and changes the state data to show that a constant has been read from one of the first constant storage means and the second constant storage means.

16. A VLIW (Very Long Instruction Word) processor for decoding and executing instructions, each instruction including a format field storing a format code showing the instruction format and a plurality of operation fields for indicating operations that are to be executed in parallel, the VLIW processor including:

an instruction register for storing an instruction;

first constant storage means including a first storage area;

second constant storage means including a second storage area;

decoding means decoding the format field in the instruction stored in the instruction register and, depending on a content of the format field, for giving an indication of one of two cases listed below (1) a first case where at least one operation field includes a first constant to be stored into the first constant storage means, and (2) a second case where at least one operation field includes a second constant to be stored into the second constant storage means, and for decoding the operation field in the instruction stored in the instruction register and, depending on a content of the operation field, for giving an indication of one of two cases listed below (3) a third case where a constant stored in the first constant storage means is to be used in at least one operation, and (4) a fourth case where a constant stored in the second constant storage means is to be used in at least one operation;

constant transfer means for operating as follows (a) when the decoding means indicates the first case and no valid constant is stored in the first constant storage means, the constant transfer means transfers the first constant from the instruction register to the first constant storage means and sets the transferred first constant in the first constant storage means as a valid constant, (b) when the decoding means indicates the first case and a valid constant is stored in the first constant storage means, the constant transfer means transfers the first constant from the instruction register to the first constant storage means so as to retain the valid constant, links the first constant and the valid constant in the first constant storage means, and sets a linking result as a new valid constant, (c) when the decoding means indicates the second case and no valid constant is stored in the second constant storage means, the constant transfer means transfers the second constant from the instruction register to the second constant storage means and sets the transferred second constant in the second constant storage means as a valid constant, (d) when the decoding means indicates the second case and a valid constant is stored in the second constant storage means, the constant transfer means transfers the second constant from the instruction register to the second constant storage means so as to retain the valid constant, links the second constant and the valid constant in the second constant storage means, and sets a linking result as a new valid constant; and execution means for operating as follows (i) when the decoding means indicates the third case, the execution means reads the linked constant stored in the first constant storage means and executes the operation using the read constant as an operand, and (ii) when the decoding means indicates the fourth case, the execution means reads the linked constant stored in the second constant storage means and executes the operation using the read constant as an operand.

17. The VLIW processor of claim 16, wherein the decoding means indicates one of the third case and the fourth case based on an operation code for the operation.

18. The VLIW processor of claim 17, wherein the decoding means indicates the third case when an operation code shows a branch operation and the fourth case when an operation code shows an arithmetic logic operation, the first constant storage means being provided specially for branch operations and the second constant storage means being provided for arithmetic logic a operations.

19. The VLIW processor of claim 18, wherein in the first case, the constant transfer means has a valid value stored in the first constant storage means shifted by a number of bits in the first constant, transfers the first constant from the instruction register to a free space in the first constant storage means produced by shifting the valid value, and so links the first constant with the valid value in the first constant storage means, and in the second case, the constant transfer means has a valid value stored in the second constant storage means shifted by a number of bits in the second constant, transfers the second constant from the instruction register to a free space in the second constant storage means produced by shifting the valid value, and so links the second constant with the valid value in the second constant storage means.

20. The VLIW processor of claim 18, wherein the constant transfer means stores first state data showing whether a valid constant is stored in the first constant storage means and second state data showing whether a valid constant is stored in the second constant storage means, and;

in the first case, after transferring the first constant from the instruction register to the first constant storage means, the constant transfer means changes the first state data to show that a valid constant is stored in the first constant storage means;

in the second case, after transferring the second constant from the instruction register to the second constant storage means, the constant transfer means changes the second state data to show that a valid constant is stored in the second constant storage means;

in the third case, when the execution means has read the constant stored in the first constant storage means, the constant transfer means clears the first storage region and changes the first state data to show that no valid constant is stored in the first constant storage means; and in the fourth case, when the execution means has read the constant stored in the second constant storage means, the constant transfer means clears the second storage region and changes the second state data to show that no valid constant is stored in the second constant storage means.

21. The VLIW processor of claim 16, wherein the decoding means indicates one of the third case and the fourth case based on operands included in the instruction in the instruction register.

22. A VLIW processor for decoding and executing instructions, each instruction including a format field storing a format code showing the instruction format and a plurality of operation fields for indicating operations that are to be executed in parallel, the VLIW processor including:

an instruction register for storing an instruction;

first constant storage means including a first storage area;

second constant storage means including a second storage area;

decoding means for decoding the format field in the instruction stored in the instruction register and, depending on a content of the format field, for giving an indication of one of two cases listed below (1) a first case where at least one operation field includes a first constant to be stored into the first constant storage means, and (2) a second case where at least one operation field includes a second constant to be stored into the second constant storage means, and for decoding the operation field in the instruction stored in the instruction register and, depending on a content of the operation field, for giving an indication of one of two cases listed below (3) a third case where a constant stored in the first constant storage means is to be used in at least one operation, and (4) a fourth case where a constant stored in the second constant storage means is to be used in at least one operation;

constant transfer means for storing first state data showing whether a constant has been read from the first constant storage means and second state data showing whether a constant has been read from the second constant storage means, and for operating as follows (a) when the decoding means indicates the first case and the first state data shows that the constant has been read from the first constant storage means, the constant transfer means clears the first storage region, transfers the first constant from the instruction register to the first constant storage means, and sets the first state data to show that a constant has not been read from the first constant storage means, (b) when the decoding means indicates the first case and the first state data shows that a constant has not been read from the first constant storage means, the constant transfer means transfers the first constant from the instruction register to the first constant storage means without deleting a valid constant that is stored in the first constant storage means, links the first constant and the valid constant in the first constant storage means, and sets a linking result as a new valid constant, (c) when the decoding means indicates the second case and the second state data shows that the constant has been read from the second constant storage means, the constant transfer means clears the second storage region, transfers the second constant from the instruction register to the second constant storage means, and sets the second state data to show that a constant has not been read from the second constant storage means, (d) when the decoding means indicates the second case and the second state data shows that a constant has not been read from the second constant storage means, the constant transfer means transfers the second constant from the instruction register to the second constant storage means without deleting a constant that is stored in the second constant storage means, links the second constant and a valid constant in the second constant storage means, and sets a linking result as a new valid constant; and execution means for operating as follows (i) when the decoding means indicates the third case, the execution means reads the linked constant stored in the first constant storage means and executes the operation using the read constant as an operand, and (ii) when the decoding means indicates the fourth case, the execution means reads the linked constant stored in the second constant storage means and executes the operation using the read constant as an operand, wherein in the third case, after the execution means reads the linked constant stored in the first constant storage means, the constant transfer means sets the first state data to show that the constant has been read from the first constant storage means, and in the fourth case, after the execution means reads the linked constant stored in the second constant storage means, the constant transfer means sets the second state data to show that the constant has been read from the second constant storage means.

23. A VLIW processor for decoding and executing instructions, each instruction including a format field storing a format code showing the instruction format and a plurality of operation fields for indicating operations that are to be executed in parallel, the VLIW processor including:

an instruction register for storing an instruction;

first constant storage means including a first storage region for storing a constant in a first format;

second constant storage means including a second storage region for storing the constant in a second format;

decoding means for decoding the format field in the instruction stored in the instruction register and indicating a case given below (1) a first case where at least one operation field in the instruction includes a storage constant that is to be stored in the first constant storage means and the second constant storage means, and for decoding the operation field in the instruction stored in the instruction register and, depending on a content of the operation field, for giving an indication of one of two cases given below (2) a second case where the constant in the first format is used in at least one operation, and (3) a third case where the constant in the second format is used in at least one operation;

constant transfer means for operating as follows—

(a) when the decoding means gives an indication of the first case and no valid constant is stored in the first constant storage means and the second constant storage means, the constant transfer means transfers the storage constant from the instruction register to the first constant storage means and the second constant storage means, and for setting the transferred storage constant in the first constant storage means and the second constant storage means as valid constants;

(b) when the decoding means gives an indication of the first case and a valid constant is stored in the first constant storage means and the second constant storage means, the constant transfer means transfers the storage constant from the instruction register to the first constant storage means and the second constant storage means so that the valid constants are not deleted, links the transferred storage constant with the valid constant in the first constant storage means and the valid constant in the second constant storage means, and sets linking results for the first constant storage means and the second constant storage means as valid constants, the valid constant stored in the first constant storage means being stored in a first format and the valid constant stored in the second constant storage means being stored in a second format; and execution means for reading, when the decoding means gives an indication of the second case, the linked constant stored in the first constant storage means and executing the operation using the read constant, and for reading, when the decoding means gives an indication of the third case, the linked constant stored in the second constant storage means and executing the operation using the read constant.

24. The VLIW processor of claim 23, wherein the first format is a zero-extended format and the second format is a sign-extended format.

25. The VLIW processor of claim 24, wherein in the first case, the constant transfer means has a valid constant stored in the first constant storage means shifted by a number of bits in the storage constant, transfers the storage constant into a blank space that is produced by a shifting, and links the storage constant with the valid constant in the first constant storage means, and in the second case, the constant transfer means has a valid constant stored in the second constant storage means shifted by a number of bits in the storage constant, transfers the storage constant into a blank space that is produced by a shifting, and links the storage constant with the valid constant in the second constant storage means.

26. The VLIW processor of claim 24, wherein the constant transfer means stores state data showing whether a valid constant is stored in the first constant storage means and the second constant storage means, and in the first case, after transferring the storage constant from the instruction register to the first constant storage means and the second constant storage means, the constant transfer means changes the state data to show that a valid constant is stored in the first constant storage means and the second constant storage means, in the second case, after the execution means has read the constant from the first constant storage means, the constant transfer means clears the first constant storage means and the second constant storage means and changes the state data to show that no valid constant is stored in the first constant storage means and the second constant storage means, and in the third case, after the execution means has read the constant from the second constant storage means, the constant transfer means clears the first constant storage means and the second constant storage means and changes the state data to show that no valid constant is stored in the first constant storage means and the second constant storage means.

27. The VLIW processor of claim 23, wherein the first format and the second format are a combination of any two of: a zero-extended format; a sign-extended format; an absolute value format; a 1's complement format: a 2's complement format: an excess $2^{(n-1)}$ format; a floating-point format; a pack format; and an unpack format.

28. The processor of claim 23, wherein the decoding means gives an indication for one of the second case and the third case based on an operation code for the operation.

29. The processor of claim 23, wherein the decoding means gives an indication for one of the second case and the third case based on an operand of the operation.

30. A VLIW processor for decoding and executing instructions, each instruction including a format field storing a format code showing the instruction format and a plurality of operation fields for indicating operations that are to be executed in parallel, the VLIW processor including:

an instruction register for storing an instruction;

first constant storage means including a first storage region for storing a constant in a first format;

second constant storage means including a second storage region for storing the constant in a second format;

decoding means for decoding the format field in the instruction stored in the instruction register and indicating a case given below (1) a first case where at least one operation field in the instruction includes a storage constant that is to be stored in the first constant storage means and the second constant storage means, and for decoding the operation field in the instruction stored in the instruction register and, depending on a content of the operation field, for giving an indication of one of two cases given below (2) a second case where the constant in the first format is used in at least one operation, and (3) a third case where the constant in the second format is used in at least one operation;

constant transfer means for storing state data showing whether a constant has been read from either of the first constant storage means and the second constant storage means, and for operating as follows (a) when the decoding means gives an indication of the first case and the state data shows that a constant has been read from one of the first constant storage means and the second constant storage means, the constant transfer means clears the first constant storage means and the second constant storage means, transfers the storage constant from the instruction register to the first constant storage means and the second constant storage means, and changes the state data to show that a constant has not been read from either of the first constant storage means and the second constant storage means, (b) when the decoding means gives an indication of the first case and the state data shows that a constant has not been read from one of the first constant storage means and the second constant storage means, the constant transfer means transfers the storage constant from the instruction register to the first constant storage means and the second constant storage means so that the respective constants in the first constant storage means and the second constant storage means are not deleted, links the transferred storage constant with the valid constant in the first constant storage means and with the valid constant in the second constant storage means, and sets respective linking results as new constants; and execution means for reading, when the decoding means gives an indication of the second case, the linked constant stored in the first constant storage means and executing the operation using the read constant, and for reading, when the decoding means gives an indication of the third case, the linked constant stored in the second constant storage means and executing the operation using the read constant, wherein in the second case, after the linked constant in the first constant storage means has been read by the execution means, the constant transfer means clears the first storage region and the second storage region, and changes the state data to show that a constant has been read from one of the first constant storage means and the second constant storage means, and in the third case, after the linked constant in the first constant storage means has been read by the execution means, the constant transfer means clears the second storage region and the second storage region, and changes the state data to show that a constant has been read from one of the first constant storage means and the second constant storage means.

* * * * *